US011342977B2

(12) United States Patent
Ali et al.

(10) Patent No.: US 11,342,977 B2
(45) Date of Patent: May 24, 2022

(54) METHOD AND APPARATUS OF FUSING RADIO FREQUENCY AND SENSOR MEASUREMENTS FOR BEAM MANAGEMENT

(71) Applicant: Samsung Electronics Co., Ltd., Suwon-si (KR)

(72) Inventors: Anum Ali, Plano, TX (US); Jianhua Mo, Allen, TX (US); Khuong N. Nguyen, Frisco, TX (US); Boon Loong Ng, Plano, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/129,820

(22) Filed: Dec. 21, 2020

(65) Prior Publication Data

US 2022/0038157 A1    Feb. 3, 2022

Related U.S. Application Data

(60) Provisional application No. 63/060,521, filed on Aug. 3, 2020, provisional application No. 63/060,493, filed on Aug. 3, 2020.

(51) Int. Cl.
*H04B 7/06* (2006.01)
*H04B 17/309* (2015.01)
(Continued)

(52) U.S. Cl.
CPC .......... *H04B 7/0639* (2013.01); *H04B 17/27* (2015.01); *H04B 17/309* (2015.01); *H04B 17/382* (2015.01); *H04W 24/10* (2013.01)

(58) Field of Classification Search
CPC .... H04B 7/0639; H04B 17/27; H04B 17/309; H04B 17/382; H04W 24/10
(Continued)

(56) References Cited

U.S. PATENT DOCUMENTS

| 10,520,607 B2 | 12/2019 | Park |
| 10,979,126 B2 | 4/2021 | Kim |

(Continued)

FOREIGN PATENT DOCUMENTS

| KR | 10-1498940 B1 | 3/2015 |
| KR | 10-2017-0073526 A | 6/2017 |
| KR | 10-2018-0072402 A | 6/2018 |

OTHER PUBLICATIONS

Rezaie, S., et al., "Location- and Orientation-Aided Millimeter Wave Beam Selection Using Deep Learning", 2020 IEEE International Conference on Communications (ICC), Aalborg University Denmark, Jun. 7-11, 2020, 7 pages.

(Continued)

*Primary Examiner* — Fitwi Y Hailegiorgis

(57) ABSTRACT

A method for beam management by a user equipment (UE) in a wireless communication system. The method includes determining reference signal measurements from signals received from one or more base stations. The method also includes obtaining, from a motion sensor, motion information of the UE. The method further includes generating beam management information for the beam management based on the reference signal measurements and the motion information. The method additionally includes identifying a beam based on the generated beam management information. The method also includes performing wireless communication based on the identified beam.

20 Claims, 19 Drawing Sheets

(51) Int. Cl.
  *H04B 17/382* (2015.01)
  *H04B 17/27* (2015.01)
  *H04W 24/10* (2009.01)

(58) Field of Classification Search
  USPC .......................................................... 375/262
  See application file for complete search history.

(56) References Cited

U.S. PATENT DOCUMENTS

| 2018/0205421 | A1  | 7/2018 | Park et al. |
| 2019/0150133 | A1* | 5/2019 | Li ..................... H04W 72/0413 |
| | | | 375/224 |
| 2019/0245606 | A1  | 8/2019 | Ha et al. |
| 2020/0077285 | A1* | 3/2020 | Yu ......................... H04B 7/088 |

OTHER PUBLICATIONS

Brambilla, M., et al., "Inertial Sensor Aided mmWave Beam Tracking to Support Cooperative Autonomous Driving", 2019 IEEE International Conference on Communications Workshops (ICC Workshops), Shanghai, China, May 20-24, 2019, 6 pages.

Qi, Z., et al., "Three-dimensional millimetre-wave beam tracking based on smart phone sensor measurements and direction of arrival/ time of arrival estimation for 5G networks", The Institution of Engineering and Technology, IET Microw. Antennas Propag., vol. 12, Issue 3, 2018, 9 pages.

Shim, D., et al., "Application of Motion Sensors for Beam-Tracking of Mobile Stations in mmWave Communication Systems", Sensors 2014, 14, 19622-19638; doi: 10.3390/s141019622, Oct. 20, 2014, 17 pages.

International Search Report dated Oct. 22, 2021 in connection with International Patent Application No. PCT/KR2021/008947, 4 pages.

Written Opinion of the International Searching Authority dated Oct. 22, 2021 in connection with International Patent Application No. PCT/KR2021/008947, 4 pages.

* cited by examiner

| CONDITION | GENERATE BEAM MANAGEMENT INFORMATION |
|---|---|
| SLOW ROTATION | GENERATE BEAM MANAGEMENT INFORMATION USING RF |
| FAST ROTATION | GENERATE BEAM MANAGEMENT INFORMATION USING RF AND MOTION INFORMATION |
| ERRONEOUS MOTION SENSOR INFORMATION | GENERATE BEAM MANAGEMENT INFORMATION USING RF |
| ACCURATE MOTION SENSOR INFORMATION | GENERATE BEAM MANAGEMENT INFORMATION USING RF AND MOTION INFORMATION |
| ERRONEOUS RF MEASUREMENT INFORMATION | GENERATE BEAM MANAGEMENT INFORMATION USING RF AND MOTION INFORMATION |
| ACCURATE RF MEASUREMENT INFORMATION | GENERATE BEAM MANAGEMENT INFORMATION USING RF |
| RF MEASUREMENT UPDATE RATE GREATER THAN OR EQUAL TO THE MOTION SENSOR UPDATE RATE | GENERATE BEAM MANAGEMENT INFORMATION USING RF |
| RF MEASUREMENT UPDATE RATE LESS THAN THE MOTION SENSOR UPDATE RATE | GENERATE BEAM MANAGEMENT INFORMATION USING RF AND MOTION INFORMATION |

FIG. 7B

| STATE | IMPACT OF THE CHOICE OF CHANNEL PARAMETER |
|---|---|
| LOS | LOW VALUES OF M AND N (EXAMPLE M = 800, N = 100) |
| NLOS | HIGH VALUES OF M AND N (EXAMPLE M = 1,200, N = 200) |
| TRANSITION FROM LOS TO NLOS OR TRANSITION FROM NLOS TO LOS | INCREASE THE VALUES OF M AND N FOR A FEW TIME-STEPS UNTIL THE PARTICLES CONVERGE AGAIN (EXAMPLE: M = 2,000, N = 400, FOR 20 TIME STEPS) |
| LOW UE SPEED | LOW VALUES OF M AND N (EXAMPLE M = 800, N = 100) |
| MEDIUM UE SPEED | MEDIUM VALUES OF M AND N (EXAMPLE M = 1,000, N = 150) |
| HIGH UE SPEED | HIGH VALUES OF M AND N (EXAMPLE M = 1,200, N = 200) |

FIG. 8D

METHOD AND APPARATUS OF FUSING RADIO FREQUENCY AND SENSOR MEASUREMENTS FOR BEAM MANAGEMENT

CROSS-REFERENCE TO RELATED APPLICATION AND CLAIM OF PRIORITY

This application claims priority under 35 U.S.C. § 119(e) to U.S. Provisional Patent Application No. 63/060,493 filed on Aug. 3, 2020 and U.S. Provisional Patent Application No. 63/060,521 filed on Aug. 3, 2020. The above-identified provisional patent applications are hereby incorporated by reference in their entirety.

TECHNICAL FIELD

This disclosure relates generally to wireless communication systems. More specifically, this disclosure relates to a beam selection operation at a terminal or user equipment (UE) based on combining radio frequency (RF) and sensor measurements.

BACKGROUND

To meet the demand for wireless data traffic having increased since deployment of the fourth generation (4G) communication systems and to enable various vertical applications, efforts have been made to develop and deploy an improved 5th generation (5G) or new radio (NR) or pre-5G/NR communication system. Therefore, the 5G/NR or pre-5G/NR communication system is also called a "beyond 4G network" or a "post LTE system."

5G/NR mobile communications are recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides method and apparatus of combining reference signals and sensor measurements for beam management.

In one embodiment, a UE for beam management in a wireless communication system is provided. The UE includes a transceiver, a motion sensor, and a processor. The transceiver is configured to receive signals from one or more base stations. The motion sensor is configured to generate motion information. The processor is operably connected to the transceiver and the motion sensor. The processor is configured to determine reference signal measurements from the signals. The processor is also configured to obtain the motion information of the UE. The processor is further configured to generate beam management information for the beam management based on the reference signal measurements and the motion information. The processor is additionally configured to identify a beam based on the generated beam management information. The processor is also configured to perform wireless communication based on the identified beam.

In another embodiment, a method for beam management by a user equipment (UE) in a wireless communication system is provided. The method includes determining reference signal measurements from signals received from one or more base stations. The method also includes obtaining, from a motion sensor, motion information of the UE. The method further includes generating beam management information for the beam management based on the reference signal measurements and the motion information. The method additionally includes identifying a beam based on the generated beam management information. The method also includes performing wireless communication based on the identified beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7B illustrates a table of example parameters for generating beam management information according to embodiments of the present disclosure;

FIG. 8D illustrates a table indicating how different states affect the particle filer according to embodiments of the present disclosure;

DETAILED DESCRIPTION

Figure 1:
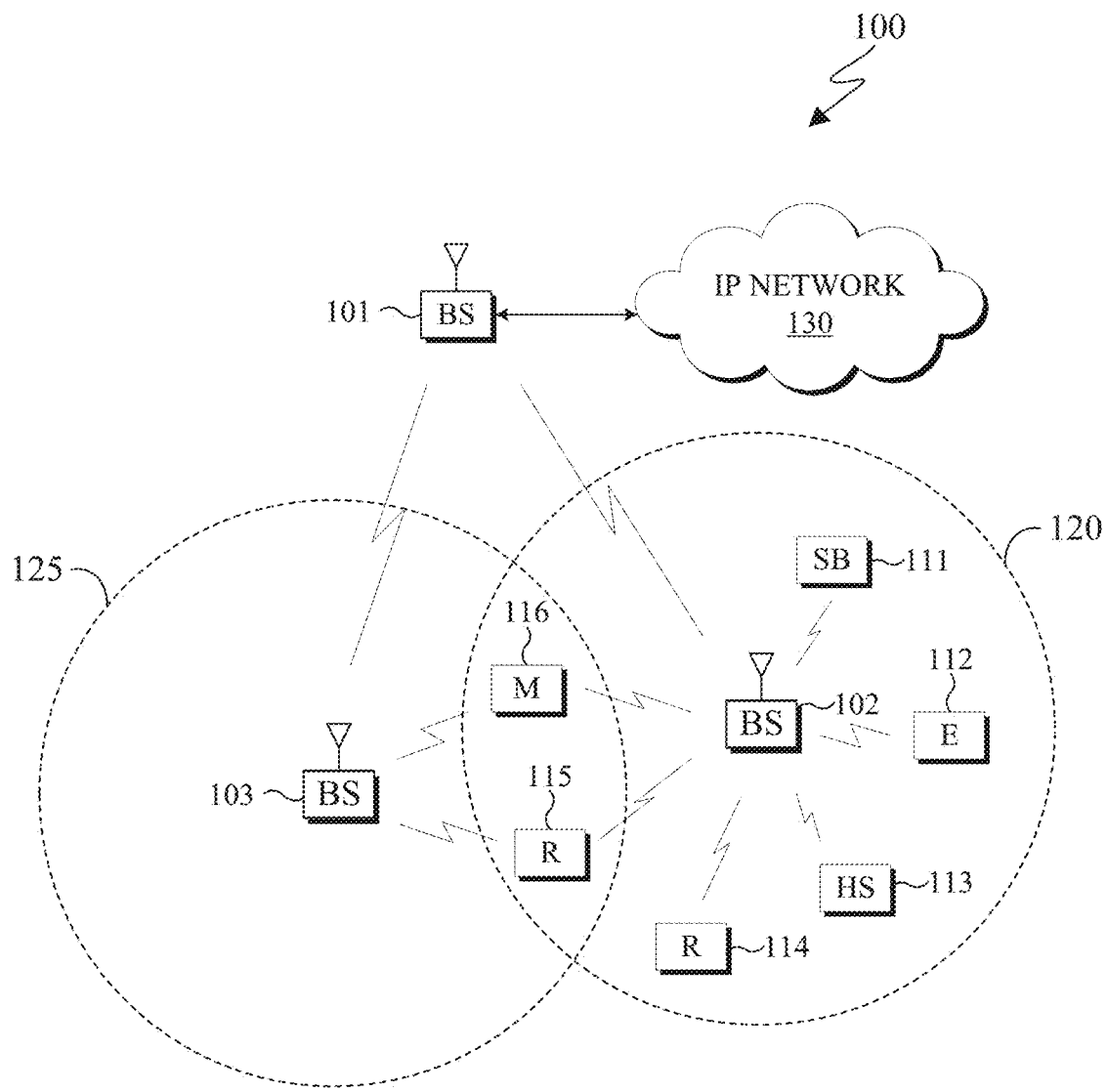
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Embodiments of the present disclosure describe a communication system. In certain embodiments the communication system can be a millimeter wave (mmWave) wireless communication systems. The communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology.

In certain embodiments, a BS can transmit multiple pilot signals. The UE can receive the transmitted pilot signals from the beams and then identify the beam with the highest received power as the best beam. The UE can then measure reference signals (such as reference signal received power (RSRP), signal-to-interference-and-noise ratio (SINR), signal-to-noise ratio (SNR), reference signal received quality (RSRQ), and the like) either one beam at a time or multiple beams at a time. For example, the UE can measure the multiple reference signals to find a beam with the strongest signal. The strongest reference signal can be identified by comparing gain of multiple reference signals or any other type of metric such as RSRP, SINR, SNR, RSRQ, and the like. The beam that has the best reference signal measurement is selected and used for the signal reception and/or transmission.

Embodiments of the present disclosure recognize and take into consideration that the identified best beam may not remain the best beam as the channel changes. A channel can change due to movement of the UE such as when a user changes the orientation of the UE which can cause a misalignment. A channel can change due to movement of the UE such as when a user moves the UE from its current location to a new location. As such, the UE will need to find the best beam again. However, measuring all of the beams can create a large latency in finding the best beam for reception and/or transmission which can reduce reception/transmission. For example if there is a 20 ms separation between each beam and there are 8 beams, the UE could take up to 160 ms to find the best new beam. During the 160 ms the use of a sub-optimal beam can result in a rate loss and degraded experience.

Therefore, embodiments of the present disclosure utilize additional sensors of the UE for finding the best beam more efficiently. For example, embodiments of the present disclosure provide an apparatus and method for combining (or fusing) the reference signal measurements (such as RSRP information) with sensor information, (such as the orientation information coming from one or more motion sensors of the UE) to find a beam for performing wireless communication.

In certain embodiments, a UE can include an orientation sensor that can indicate whether the UE rotated and if so, the direction and magnitude of the rotation. For example, if the best beam is identified from a first direction, and thereafter UE rotates, based on the rotation information, from the motion sensor, the UE can determine the new direction of the best beam based on combing the previous direction of the best beam with the rotation information.

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, B S), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The gNB 102 provides wireless broadband access to the network 130 for a first plurality of user equipment's (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam selection. In certain embodiments, and one or more of the gNBs 101-103 includes circuitry, programing, or a combination thereof, for efficient beam selection. In certain embodiments, the wireless network 100 can be a 5G communication system in which an electronic device, such as UE 116, can identify a particular beam for transmission and/or reception with a BS 102 or BS 103 based on reference signal measurements and motion information from one or more sensors of the UE 116.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
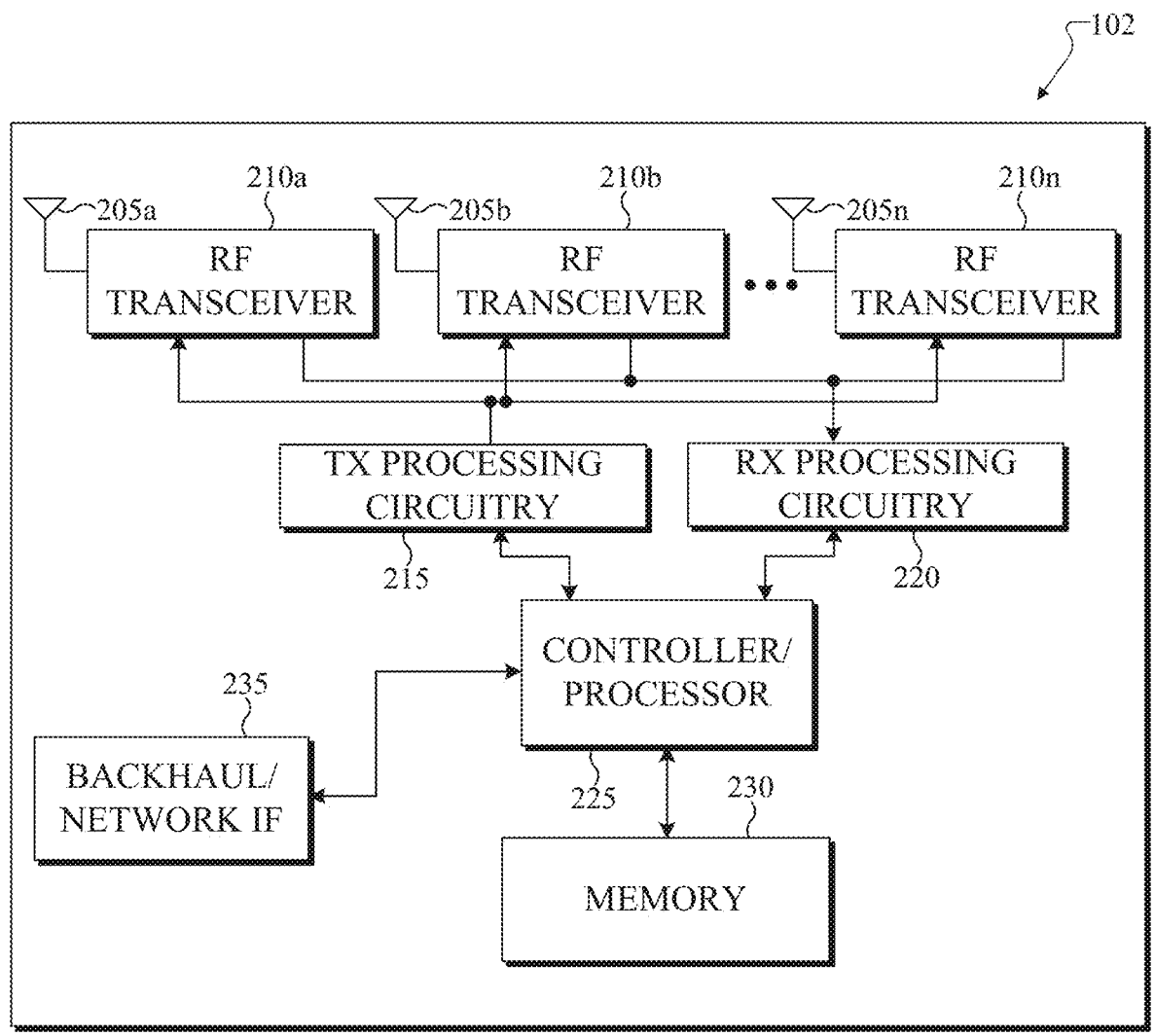
FIG. 2 illustrates an example exemplary base station in the wireless network of FIG. 1 according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming reference signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
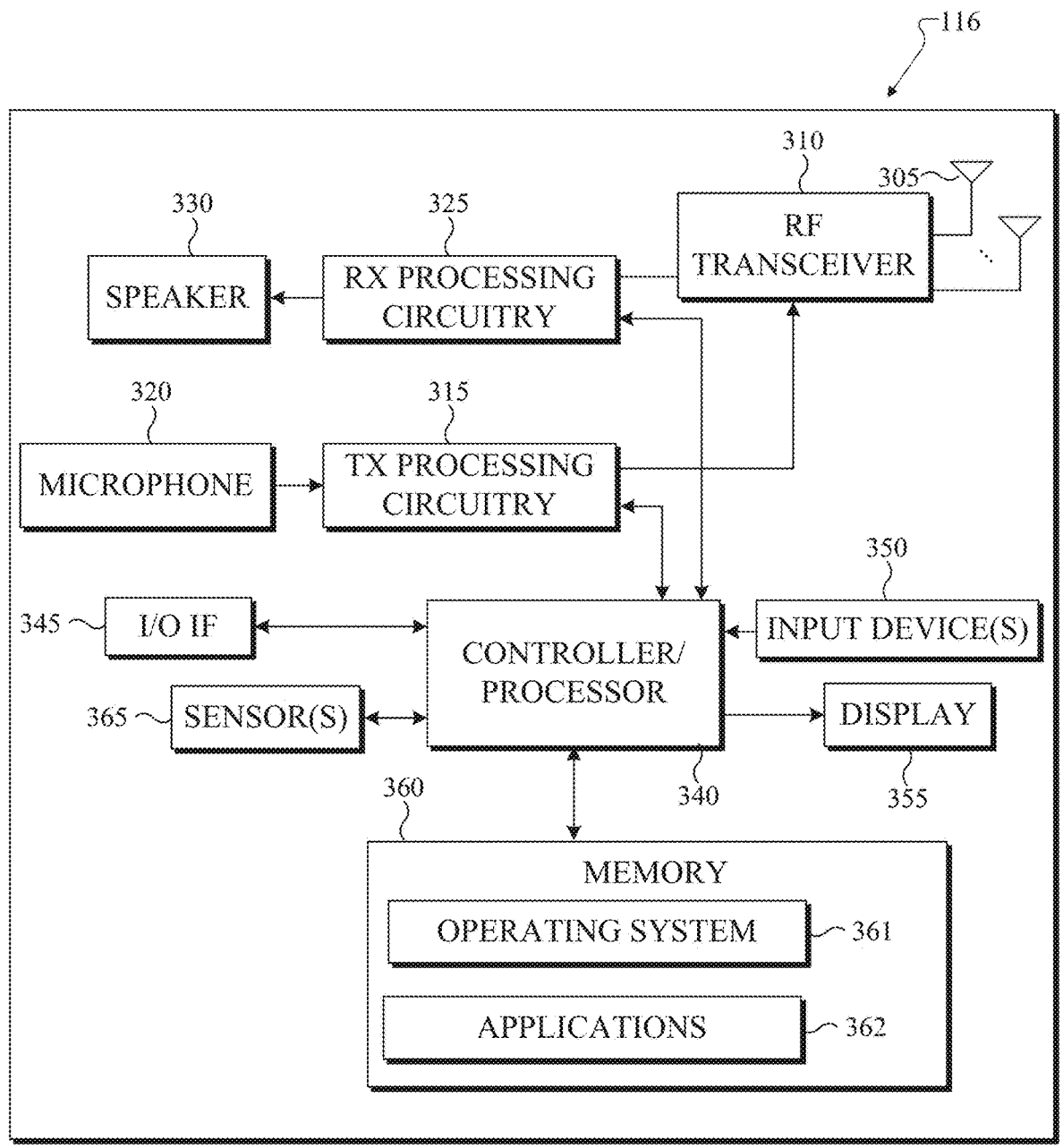
FIG. 3 illustrates an example UE in the wireless network of FIG. 1 according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350 (such as a touchscreen or keypad), a display 355, a memory 360, and a sensor(s) 365. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input 350 can be a keyboard, touchscreen, mouse, track ball, voice input, or other device capable of acting as a user interface to allow a user in interact with the UE 116. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

The processor 340 is also coupled one or more sensors 365 that can meter a physical quantity and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein. Any of these sensor(s) 365 may be located within the UE 116, within a secondary device operably connected to the UE 116, within a headset configured to hold the UE 116, or in a singular device where the UE 116 includes a headset.

As described in more detail below, the UE 116 can receive multiple beams and identify a particular beam for transmission and/or reception with a BS based on reference signal measurements and motion information via one of the sensors 365 (such as an IMU).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
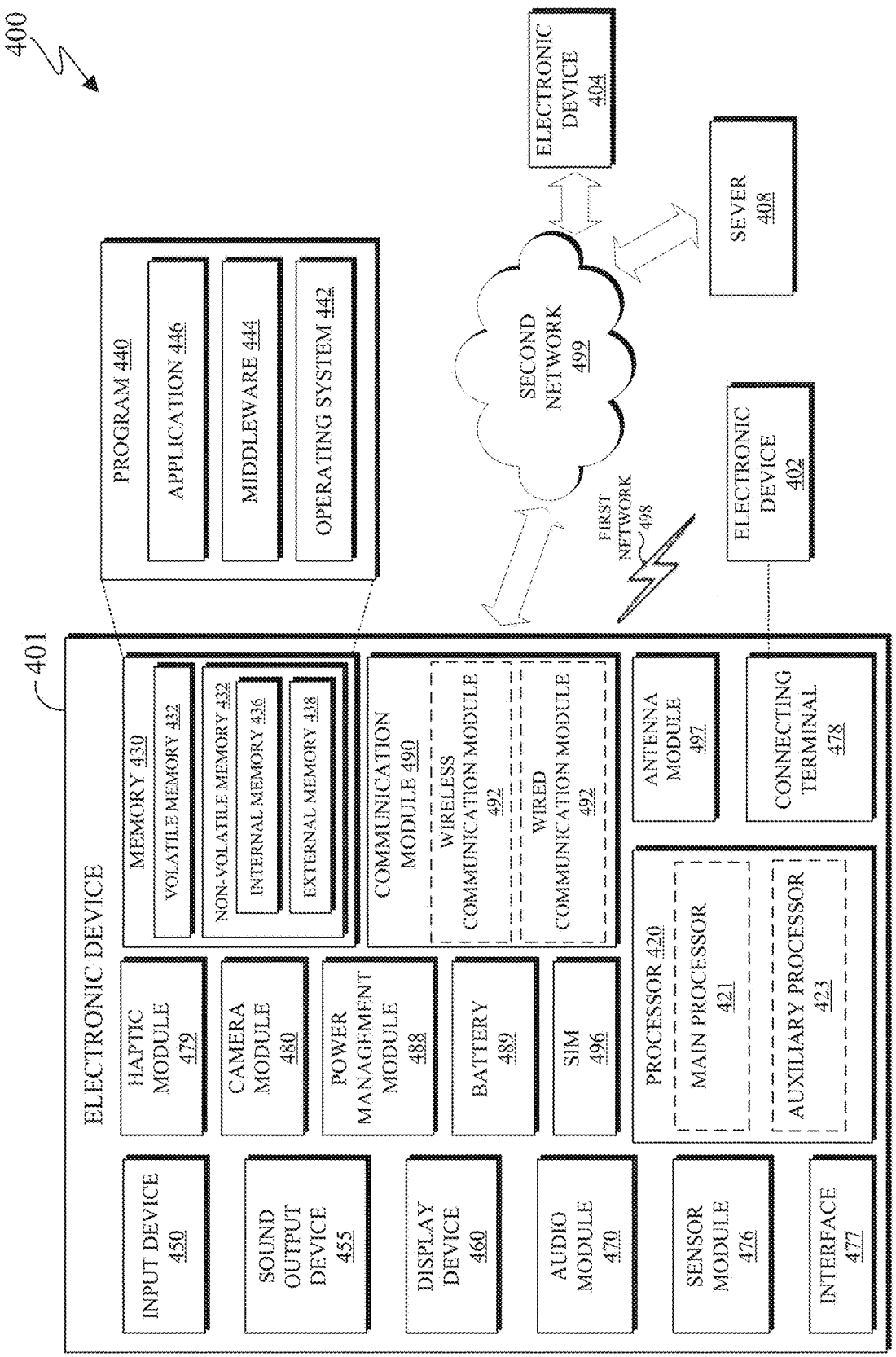
FIG. 4 illustrates an example network configuration according to embodiments of the present disclosure.

FIG. 4 illustrates an example network configuration according to embodiments of the present disclosure. An embodiment of the network configuration shown in FIG. 4 is for illustration only. One or more of the components illustrated in FIG. 4 can be implemented in specialized circuitry configured to perform the noted functions or one or more of the components can be implemented by one or more processors executing instructions to perform the noted functions.

FIG. 4 illustrated a block diagram illustrating a network configuration including an electronic device 401 in a network environment 400 according to various embodiments. As illustrated in FIG. 400, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network).

The electronic device 401 can be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420 and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434.

According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software. The program 440 may include, for example, an operating system (OS) 442, middleware 444, or an application 446.

The input device 450 may receive a command or data to be used by other components (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, or projector. According to an embodiment, the display device 460 may include touch circuitry adapted to detect a touch, or sensor circuitry (e.g., a pressure sensor) adapted to measure the intensity of force incurred by the touch. The display device 460 can be similar to the display 355 of FIG. 3.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 476 can be similar to the sensors 365 of FIG. 3.

The interface 477 may support one or more specified protocols to be used for the electronic device 101 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication.

According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as BLUETOOTH, wireless-fidelity (Wi-Fi) direct, Ultra-WideBand (UWB), or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB).

According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna.

According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 104 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 may perform a function or a service automatically, or in response to a request from a user or another device, the electronic device 401, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
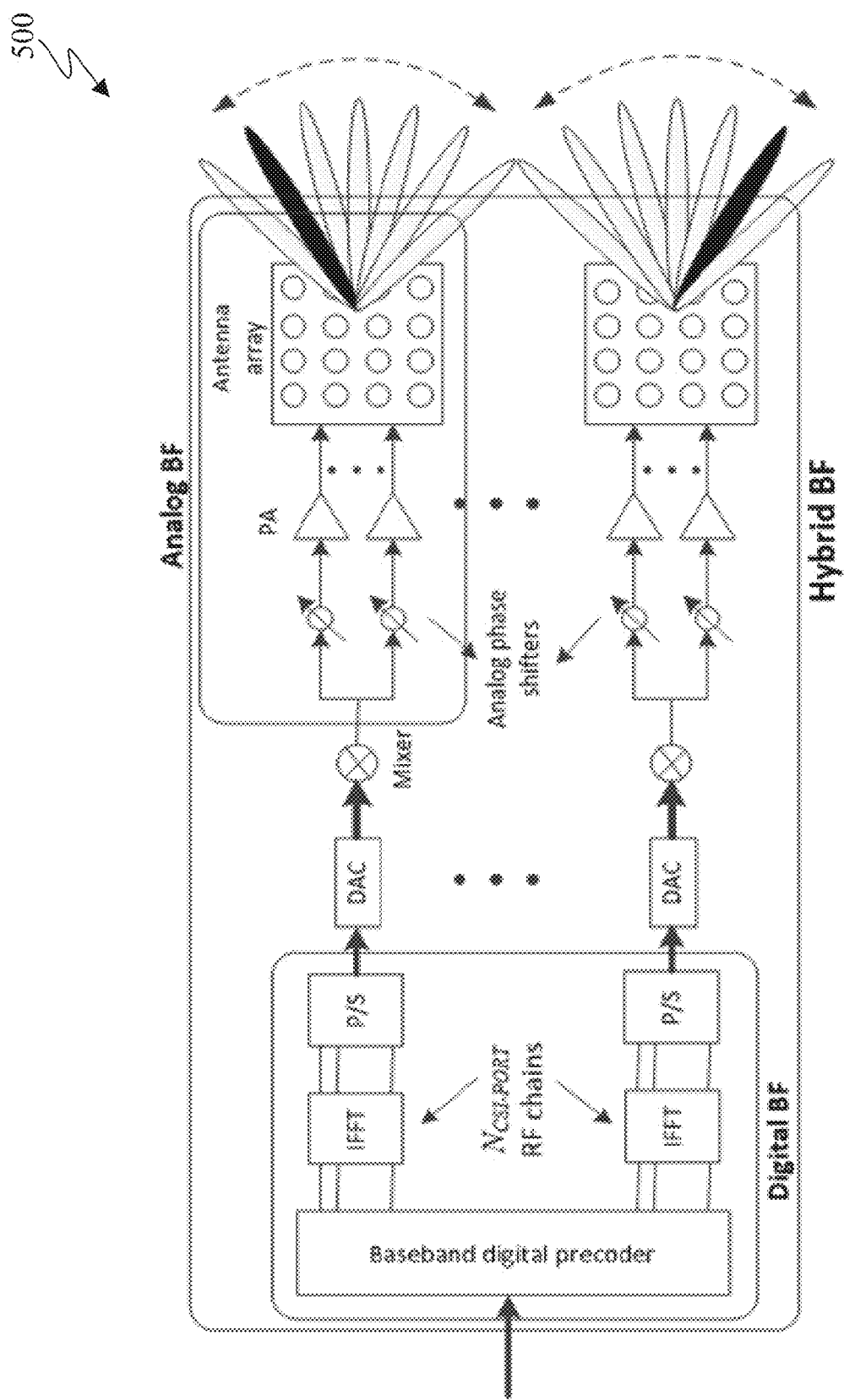
FIG. 5 illustrates an example hybrid beamforming according to embodiments of the present disclosure.

FIG. 5 illustrates an example hybrid beamforming 500 according to embodiments of the present disclosure. An embodiment of the hybrid beamforming 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

For mmWave bands, the number of antenna elements can be large for a given form factor. However, the number of digital chains may be limited due to hardware constraints (such as the feasibility to install a large number of ADCs/DACs at mmWave frequencies) as illustrated in FIG. 5. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 5 can be applied at the base station and at the UE.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam.

In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area.

In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the gNB may form receive beams.

To assist the UE in determining the RX and/or TX beam, a beam sweeping procedure is employed consisting of the gNB transmitting a set of transmit beams to sweep the cell area and the UE measuring the signal quality on different beams using the receive beams. To facilitate candidate beam identification, beam measurement and beam quality reporting, the gNB configures the UE with one or more RS resource (e.g., SS block, periodic/aperiodic/semi-persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of TX-RX beam pairs for reception of PDCCH and/or PDSCH.

In certain embodiments, a UE is equipped with multiple antenna elements. There can also be one or more antenna modules fitted on the UE where each module can have one or more antenna elements. Beamforming is an important factor when UE tries to establish a connection with a BS station. To compensate for the narrower analog beamwidth in mmWave, analog beams sweeping can be employed to enable wider signal reception or transmission coverage for the UE. A beam codebook comprises a set of codewords, where a codeword is a set of analog phase shift values, or a set of amplitude plus phase shift values, applied to the antenna elements, in order to form an analog beam.

For example, in directional beamforming based mmWave systems, to optimize a certain performance metric (e.g., the received signal power), the UE usually conducts an exhaustive search over all candidate beam codewords in the beam codebook, and selects the one that results in the best performance metric (e.g., the highest received signal power) to receive the data. If the number of candidate beam codewords in the beam codebook is large, the exhaustive search may take a very long time to converge, resulting in extensive delay for the UE to connect to the network.

In certain embodiments, a UE is also be equipped with one or more IMUs. An IMU can include accelerometers, gyroscopes, and the like for measuring and reporting orientation and angular rate of the body, among others. The configurations of an IMU may contain one or more accelerometers, gyroscopes and/or magnetometers per axis for each of the three principal axes, i.e., pitch, roll and yaw. The rate of the measurement, which determines the time between two successive measurements from IMU, varies from device to device. The measurements from the sensors are subject to error, and the level of error in each principal axes may be different and varies from device to device.

Exhaustive beam sweeping or beam search may introduce extensive delay for the UE to access to the network, and significantly increase the power consumption. Further, such beam search, especially at the UE side, happens in many different deployment scenarios and/or protocol states such as inter-cell measurement, initial access, handover and transmission configuration indicator (TCI) state switch. Hence, there is a need to design fast, yet effective beam selection method at the user terminal side to reduce the access delay and implementation complexity.

Figure 6:
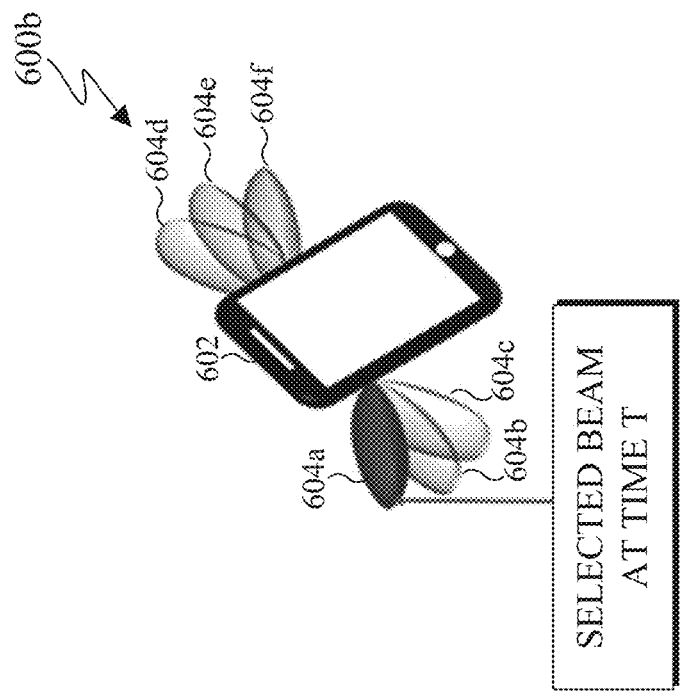
FIG. 6 illustrates an example electronic device selecting different beams based on a rotation according to embodiments of the present disclosure.
Figure 6:
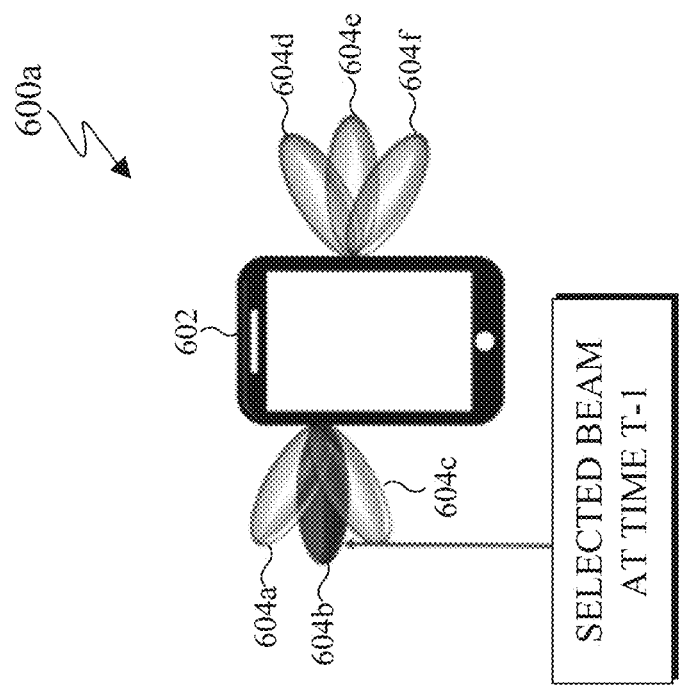

FIG. 6 illustrates an example electronic device 602 selecting different beams based on a rotation according to embodiments of the present disclosure. The electronic device 602 is similar to the any of the UEs 111-116 of FIG. 1 the UE 116 of FIG. 3, the electronic device 401 of FIG. 4. The embodiment of FIG. 6 is for illustration only and other embodiments can be used without departing from the scope of the present disclosure.

FIG. 6 illustrates an example electronic device 602 at time 600a and at time 600b. The time 600a occurs before the time 600b. As illustrated, the electronic device 602 at time 600a is at a first orientation and at time 600b the orientation of the electronic device 602 is different. The electronic device 602 at time 600a measures multiple beams such as beams 604a-604f and selects the beam 604b as the beam for transmission and reception. At time 600b, the orientation of the UE has changed. As such the electronic device 602 at time 600b again measures multiple beams such as beams 604a-604f and selects the beam 604a as the beam for transmission and reception.

Although FIG. 6 illustrates electronic device 602 and various beams changes can be made to FIG. 6. FIG. 6 does not limit this disclosure to any particular method or apparatus.

Figure 7A:
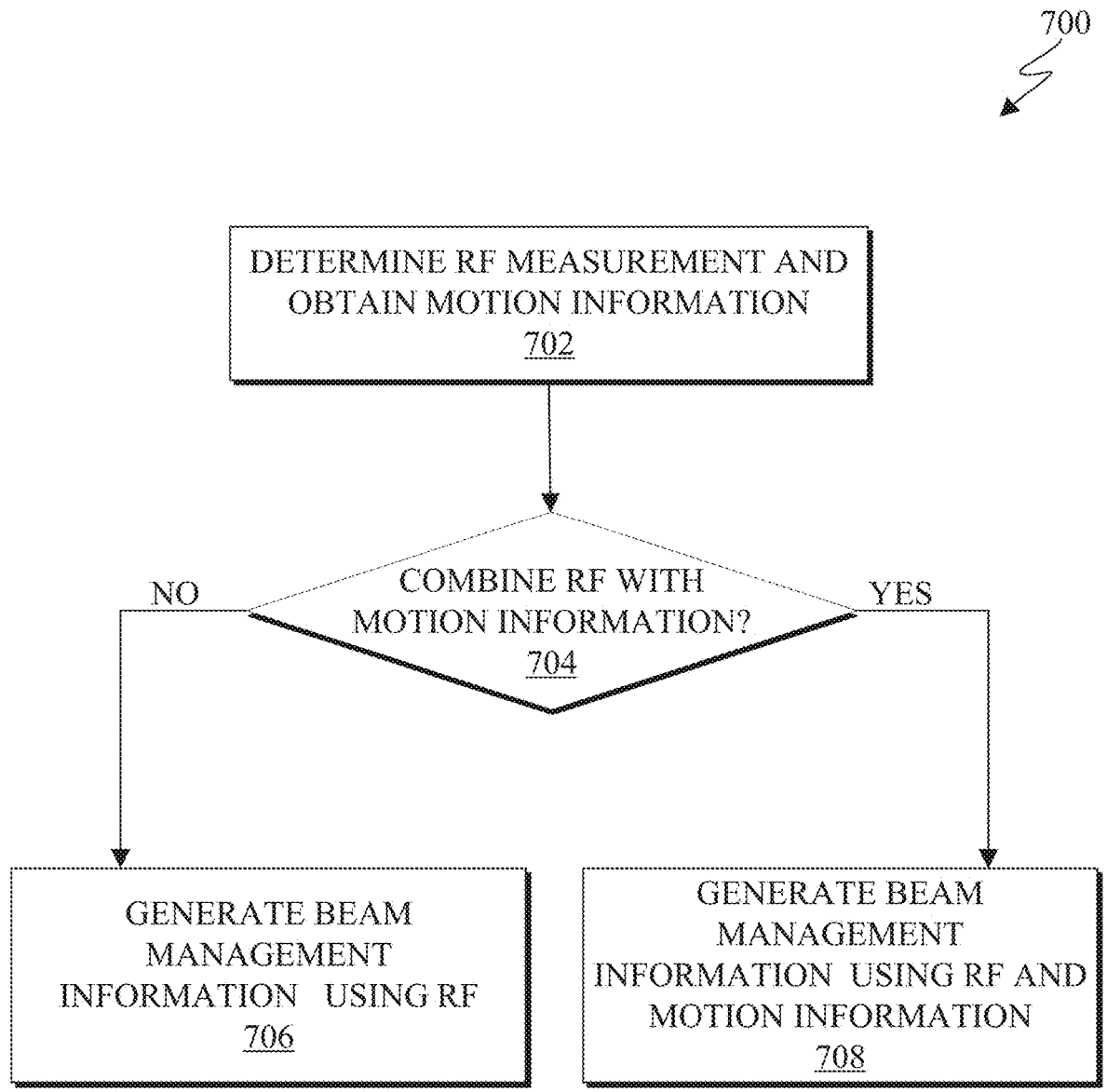
FIG. 7A illustrates a method for generating beam management information according to embodiments of the present disclosure.

FIG. 7A illustrates a method 700 for generating beam management information according to embodiments of the present disclosure. FIG. 7B illustrates a table 710 of example parameters for generating beam management information according to embodiments of the present disclosure. The steps of the method 700 can be performed by the any of the UEs 111-116 of FIG. 1 the UE 116 of FIG. 4, the electronic device 401 of FIG. 4. The embodiments of FIGS. 7A and 7B are for illustration only and other embodiments can be used without departing from the scope of the present disclosure.

The method 700 of FIG. 7A illustrates an example process for determining how to generate the beam management information. The beam management information is used for determining which beam to select to perform the wireless communication. In step 702, the UE 116 determines reference signal measurements and obtains motion information. The UE 116 can receive signals that are transmitted from one or more base stations. The UE 116 then determines a reference signal measurements, such as power from the received signals. The reference signal measurements can be based on one or more metrics such as RSRP, SINR, SNR, RSRQ, and the like. The UE 116 also obtains movement information of the UE 116. For example, a motion sensor, (such as the sensor 365 of FIG. 3) can detect motion of the UE 116. In certain embodiments, the motion sensor is an IMU, such as an accelerometer, gyroscope, and the like, which can detect and measure motion movement of the UE 116.

In step 704, the UE 116 determines whether to combine the reference signal measurement with the motion information when generating the beam management information. The table 710 of FIG. 7B provide example parameters the UE 116 can use when determining whether to combine the reference signal measurement with the motion information. For example, if the rotation of the UE 116, as detected by the motion sensor is slow (such as less than a threshold) then the UE 116 determines that the beam management information is based on the reference signal measurements, (not a combination of the reference signal measurements and the motion measurements) (step 706 of FIG. 7A). Alternatively, if the rotation of the UE 116, as detected by the motion sensor is fast (such as greater than a threshold) then the UE 116 determines that the beam management information is based on the combination of the reference signal measurements and the motion measurements (step 708 of FIG. 7A).

For another example, the UE 116 compares an error level associated with the movement information as detected by the motion sensor to a threshold, when determining whether to combine the one or more of the reference signal measurements with the movement information to generate the beam management information. For example, when the error level of the motion sensor is below the threshold, the UE 116 determines to combine the one or more of the reference signal measurements with the movement information to generate the beam management information (step 708 of FIG. 7A). Alternatively, when the error level of the motion sensor is above the threshold, the UE 116 determines to use the one or more of the reference signal measurements to generate the beam management information (step 706 of FIG. 7A).

For another example, the UE 116 compares an error level associated with the reference signal measurement to a threshold, when determining whether to combine the one or more of the reference signal measurements with the movement information to generate the beam management information. For example, when the error level of the reference signal measurement is below the threshold, the processor 340 determines to combine the one or more of the reference signal measurements with the movement information to generate the beam management information (step 708 of FIG. 7A). Alternatively, when the error level of the reference signal measurement is above the threshold, the processor 340 determines to use the one or more of the reference signal measurements to generate the beam management information (step 706 of FIG. 7A).

For another example, the UE 116 compares an update rate of the reference signal measurements to an update rate of the movement measurements, when determining whether to combine the one or more of the reference signal measurements with the movement information to generate the beam management information. For example, when the update rate of the reference signal measurements is less than the update rate of the movement information, the processor 340 determines to combine the one or more of the reference signal measurements with the movement information to generate the beam management information (step 708 of FIG. 7A). Alternatively, when the update rate of the reference signal measurements is greater than the update rate of the movement information, the processor 340 determines to use the one or more of the reference signal measurements to generate the beam management information (step 706 of FIG. 7A).

Although FIGS. 7A and 7B illustrates example method and table, various changes may be made to FIGS. 7A and 7B. For example, while method 700 of FIG. 7A is shown as a series of steps, various steps could overlap, occur in parallel, occur in a different order, or occur multiple times. In another example, steps may be omitted or replaced by other steps. Additionally, the various conditions and content that are used to generate the beam management information can be different.

Figure 8A:
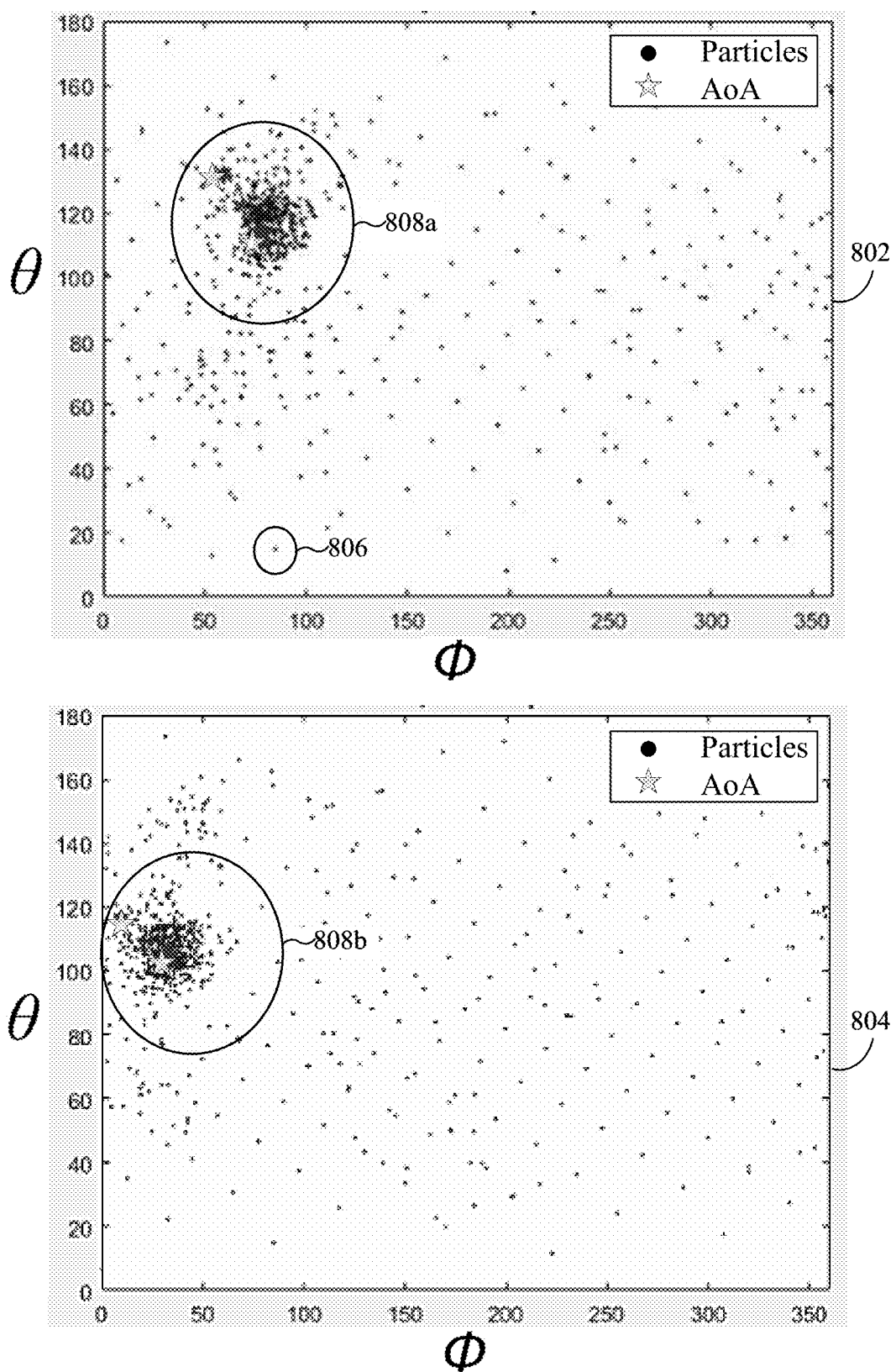
FIG. 8A illustrates example particle filters at different points in time according to embodiments of the present disclosure.
Figure 8B:
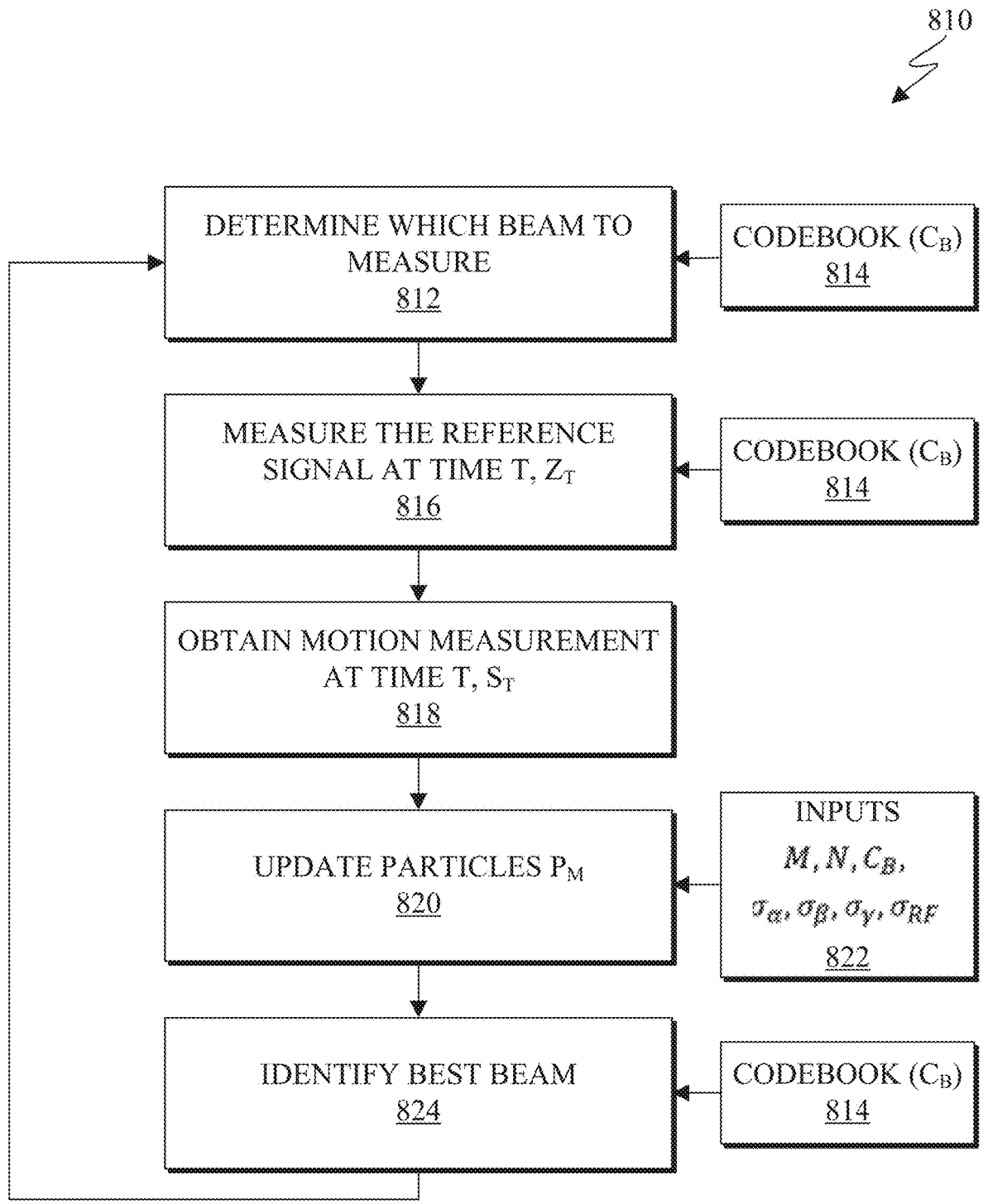
FIG. 8B illustrates an example method for identifying a beam to perform wireless communication according to embodiments of the present disclosure.
Figure 8C:
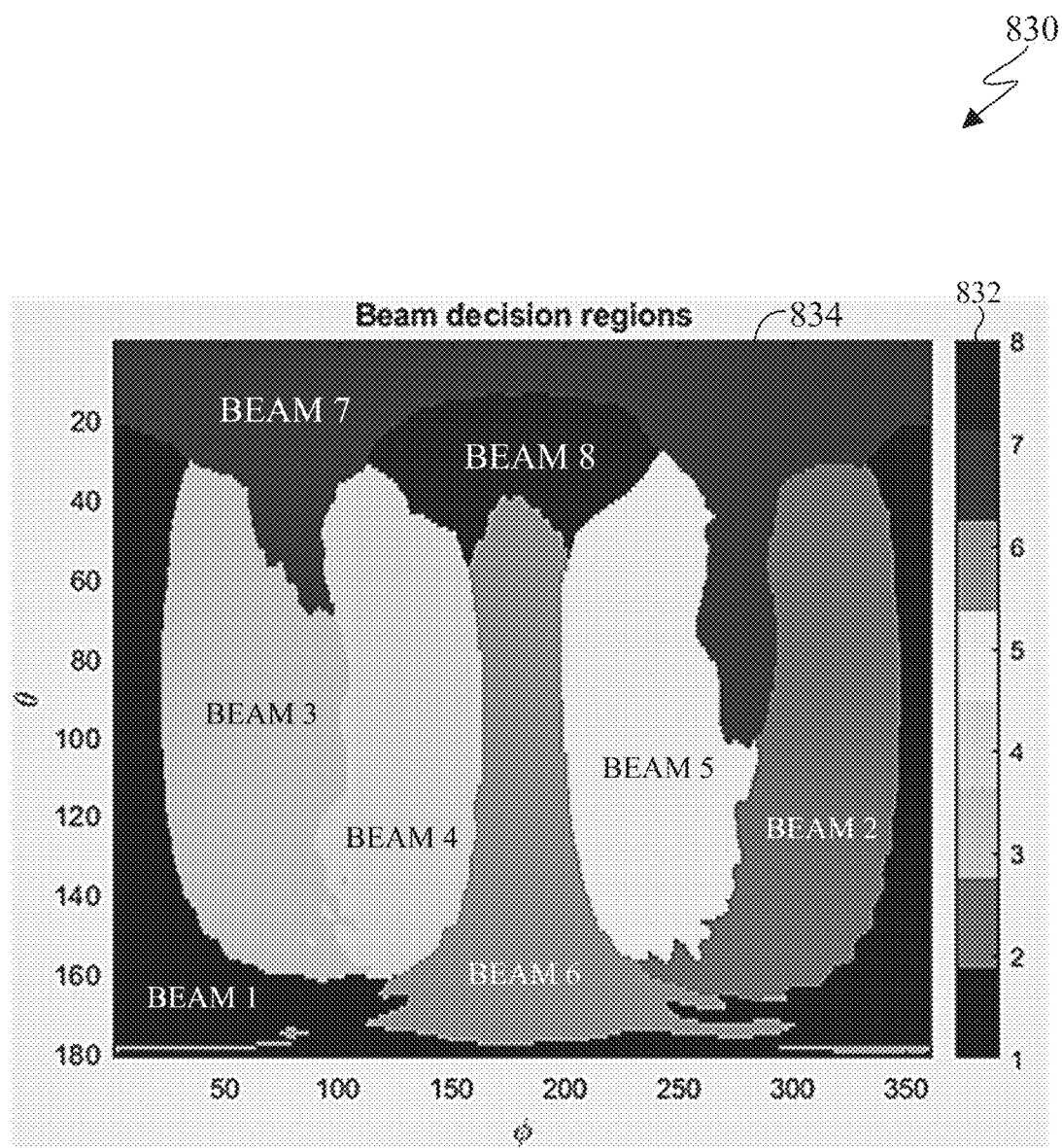
FIG. 8C illustrates an example diagram of beam decision regions corresponding to different beams according to embodiments of the present disclosure.
Figure 8E:
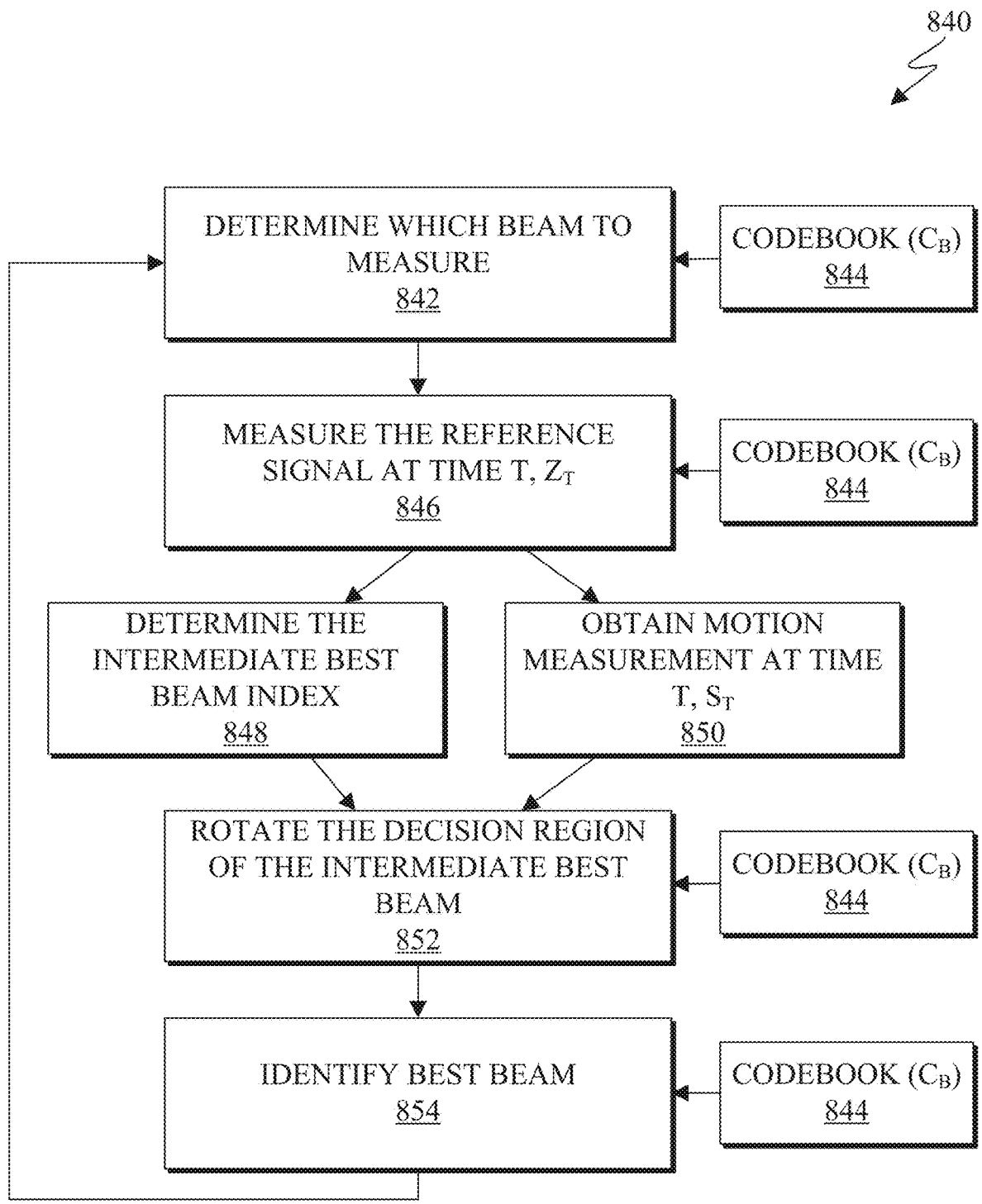
FIG. 8E illustrates an example method for identifying a beam to perform wireless communication according to embodiments of the present disclosure.

FIG. 8A illustrates example particle filters 802 and 804 at different points in time according to embodiments of the present disclosure. FIG. 8B illustrates an example method 810 for identifying a beam to perform wireless communication according to embodiments of the present disclosure. FIG. 8C illustrates an example diagram 830 of beam decision regions corresponding to different beams according to embodiments of the present disclosure. FIG. 8D illustrates a table 835 indicating how different states affect the particle filer according to embodiments of the present disclosure. FIG. 8E illustrates an example method 840 for identifying a beam to perform wireless communication according to embodiments of the present disclosure. The steps of the methods 810 and 840 can be performed by the any of the UEs 111-116 of FIG. 1 the UE 116 of FIG. 4, the electronic device 401 of FIG. 4. The embodiments of FIGS. 8A-8E are for illustration only and other embodiments can be used without departing from the scope of the present disclosure.

Embodiment of the present disclosure provide systems and methods for combining the reference signal measurements with motion information from a motion sensor associated with the UE 116 to identify a particular beam to perform wireless communication. A filter can be used to combine reference signal measurements with motion information. In certain embodiments, a particle filter is used to combine the reference signal measurements and motion measurements to identify a beam for wireless communication. FIG. 8A illustrates an example particle filters 802 and 804. As illustrated, the particle filter 802 represents particles when the UE is at a first orientation at time T, while the particle filter 804 represents particles when the UE is at a second orientation at time T+1. Other tracking filters such as Extended Kalman Filter, Unscented Kalman Filter, and the like can be used to track the angle-of-arrival (AoA) of the beams when combining the reference signal measurements and motion measurements to identify a beam for wireless communication.

The method 810, of FIG. 8B, uses a particle filter (such as the particle filters of FIG. 8A) to combine reference signal measurements and orientation measurements to identify a beam for wireless communication. A particle filter uses a set of particles, that represent a distribution of the beams. FIG. 8A illustrates the particle filter 802 at time T. The position of the particle are updated at subsequent time steps, such as at time T+1, which is illustrated in the particle filter 804. The particles can move based a movements of the UE 116 and the changes to the environment between the UE and the BS. The particle 806 is one of the many particles of the particle filters 802 and 804. The large concentration of particles in areas 808a and 808b corresponds to a particular beam that is selected, based on the reference signal measurements and orientation measurements, for performing the wireless communication.

As shown in FIG. 8B, the method 810 is generally used to identify a beam which is to be used for wireless communication based on the reference signal measurements of the beams with motion information of the UE 116. In step 812, the UE 116 determines which beam to measure and then measures the determined beam (in step 816). For example, the UE 116 can determine which beam to measure based in part on the codebook 814. The codebook 814 includes a set of codewords, where a codeword is a set of analog phase shift values, or a set of amplitude plus phase shift values, applied to the antenna elements, in order to form an analog beam. In step 816, the UE 116 measures the beam (using the RF transceiver 310 of FIG. 3) to determine a reference signal measurement from the measured beam. The UE 116 can use the codebook 814 when determine a reference signal measurement from the measured beam. In certain embodiments, the reference signal measurement is RSRP at time t, $z_t$. In other embodiments, the reference signal measurement is SINR, SNR, RSRQ, or the like. In certain embodiments, the steps 812 and 816 can be performed for multiple beams In step 818, the UE 116 obtains motion measurements from a sensor such as the sensor 365 of FIG. 3. In certain embodiments, the sensor is an IMU that detects motion, and orientation of the UE 116. For example, the movement information, that is obtained by the motion sensor, can identify the direction and magnitude of the detected motion. The UE 116 can obtain movement measurements at time t, $s_t$.

In step 820, the UE 116 uses the reference signal measurement (of step 816) and the motion sensor measurement (of step 818) and various input information (such as inputs 822) to update particles of a particle filter. The various input information (such as inputs 822) can include the number of particles, M, the number of new particles in each iteration N, the UE beam codebook $C_B$, the sensor noise level $\sigma_\alpha$, $\sigma_\beta$, $\sigma_\gamma$, and the signal measurement noise level $\sigma_{RF}$ (such as RSRP $\sigma_{RSRP}$), and the like.

Before the particles of a particle filter are updated, a particle filter is generated. To generate a particle filter the UE 116 initializes various terms and parameters (such as the inputs 822). For example, to generate the particle filter at a particular time step a number of particles, a number of new particles, error/noise associated with the transceiver and the IMU sensor, a codebook, a gain of a beam, reference signal measurement, motion information (or measurement) from a motion sensor and the like are initialized.

The number of particles (denoted as M) is set for the particle filter. For example, M could be set to 1,000, indicating that there are 1,000 particles within the particle filter. Any other number of particles can be used. Each of the particles, represents a candidate channel path and includes an angle-of-arrival (or AoA) in the UE coordinate system (such as a Cartesian coordinate system or a spherical coordinate system). There could be some angles that have a large concentration of particles and other angles have a low concentration of particles. For example, as shown in the particle filters 802 and 804, there are large concentration of particles within area 808a and 808b, while other areas of the particle filters 802 and 804 have very few particles.

Each of the particles of the particle filter, such as the $m^{th}$ particle $p_m$, is described by a location (either based on X, Y, Z, Cartesian coordinate system or a spherical coordinate system) and gain (G). For example, the $m^{th}$ particle, $p_m$, is $\{X_m, Y_m, Z_m, G_m\}$. Each of the particles, such as the $m^{th}$ particle, $p_m$, could be represented by a unit vector $d_m = [X_m, Y_m, Z_m]^T$ and gain $G_m$ at a given time T. Polar coordinates, $\{\theta_m, \phi_m\}$, can be used to represent the unit vector $d_m = [X_m, Y_m, Z_m]^T$. The expression, $G(\theta, \phi)$, indicates the gain for a beam in the direction $(\theta, \phi)$.

At each iteration (time step) a number of new particles (denoted as N) are inserted into the particle filter. In certain embodiments, the number of new particles that are inserted into the particle filter at a given iteration is 150 new particles. Any other number of new particles can be inserted into the particle filter at a given iteration. For example, the number of new particles that are decided are based on a sampling such as difference between M and N (for example, when M=1,000 and N=150, as described above, then the number of particles is 850). In certain embodiments, the number of particles that are decided are based on an importance sampling. The particles will converge into a small area (as shown in area 808a and 808b of FIG. 8A), however if the angle suddenly changes then the UE may lose transmission. As such, a number of new particles, N, are included and uniformly spaced to avoid a loss in transmission.

A motion measurement that is obtained from a sensor, such as the sensor 365 of FIG. 3, can include noise. A level of sensor noise, $\sigma$, in three dimensions representing the various directional motions and can be described as $\sigma_\alpha$, $\sigma_\beta$, $\sigma_\gamma$. The amount of noise could be different for different sensors. For one example, the noise could be described as $\sigma_\alpha = 2°$, $\sigma_\beta = 1°$, and $\sigma_\gamma = 1°$. Similarly, the reference signal measurement from a receiver (such as the RF transceiver 310 of FIG. 3 or the wireless communication module 492 of FIG. 4) can include noise. For example, when the reference signal measurement is based on RSRP, the noise could be described as $\sigma_{RSRP}$. The amount of noise could be different for different receivers and/or transceivers. For example, the noise could be described as a numerical value such as $\sigma_{RSRP} = 4.4$.

The beam codebook $C_b$ indicates candidate beams. In certain embodiments, there can be a narrow beam codebook and a wide beam codebook. The number of words in a codebook can vary. For example, a wide beam codebook could include eight words and a narrow beam codebook can include twenty-eight words.

The gain of the beam i in the direction $(\theta, \emptyset)$ can be expressed as $G_i(\theta, \emptyset)$. As discussed above the reference signal measurement could be measured at time t, $z_t$. Similarly, the motion information is measured at a time t, $s_t = [\alpha_t, \beta_t, \gamma_t]^T$. The best beam, i*, is the beam that is identified for performing the wireless communication. A rotational matrix, describing the orientation of the UE based on the motion information, is a function of $\alpha$, $\beta$, and $\gamma$ and described in Equation (1), below $$R(\alpha, \beta, \gamma) = R_z(\alpha) \times R_y(\beta) \times R_x(\gamma) \qquad \text{Equation (1)}$$

Where:

$$R_x(\gamma) = \begin{bmatrix} 1 & 0 & 0 \\ 0 & \cos(\gamma) & -\sin(\gamma) \\ 0 & \sin(\gamma) & \cos(\gamma) \end{bmatrix}$$

$$R_y(\beta) = \begin{bmatrix} \cos(\beta) & 0 & \sin(\beta) \\ 0 & 1 & 0 \\ -\sin(\beta) & 0 & \cos(\beta) \end{bmatrix}$$

$$R_z(\alpha) = \begin{bmatrix} \cos(\alpha) & -\sin(\alpha) & 0 \\ \sin(\alpha) & \cos(\alpha) & 0 \\ 0 & 0 & 1 \end{bmatrix}$$

Once the particle filter is initialized, the particles are updated (step 820). In certain embodiments, a new reference signal measurement and a new motion measurement is available in every time-step t. The updated reference signal measurement information and the updated motion information is used to update the particles $p_m$. Subsequently, the particles are used to predict the best beam index i*. Syntax (1) below describes an example of updating the particles of the particle filter.

Syntax (1)

Let $P_t = P_t = \{\{d_t^{[1]}, g_t^{[1]}\}, \{d_t^{[2]}, g_t^{[2]}\}, \ldots, \{d_t^{[M]}, g_t^{[M]}\}\}$ be the set of M particles
1:    Procedure_to_update_particles $(P_{t-1}, S_t, Z_t)$
2:    $\overline{P}_t = P_t = \emptyset$
3:    for m = 1:M
4:        $d_t^{[m]} = R_t^{[m]}(R_{t-1}^{[m]})^T$; $d_{t-1}^{[m]}$; $g_t^{[m]} = g_{t-1}^{[m]}$
5:

$$z_t^{[m]} - G(\theta_m, \emptyset_m) + g_t^{[m]}; \; w_t^{[m]} = \frac{1}{\sqrt{2\pi\sigma_{RSRP}^2}} e^{-\frac{(z_t - z_t^{[m]})^2}{2\sigma_{RSRP}^2}}$$

6:        $\overline{P}_t = \overline{P}_t = \{d_t^{[m]}, g_t^{[m]}, w_t^{[m]}\}$
7:    endfor
8:    for m=1:M-N -continued Syntax (1)

9:     draw i with probability α $w_t^{[i]}$
10:    add {$d_t^{[i]}$, $g_t^{[i]}$} to $P_t$
11:    endfor
12:    Add N new particles
13:    return Pt In certain embodiments, a new reference signal measurement or a new motion measurement is available at time t. The updated reference signal measurement information or the updated motion information is used to update the particles $p_m$. For example, if the motion sensor measurement is not available at time t, then step 4, of Syntax (1), is not executed, and such that $d_t^{[m]} = d_{t-1}^{[m]}$ and $g_t^{[m]} = g_{t-1}^{[m]}$. For another example, if the reference signal measurement is not available at time t, then step 5, of Syntax (1), is not executed, such that $w_t^{[m]} = w_{t-1}^{[m]}$. Regardless of whether the IMU measurement is not available at time t or the reference signal measurement is not available at time t, steps 6-11 are still performed. The number of new particles N in step 12 can adapted per time-step depending on whether the updated reference signal measurement or motion information is available in a given time-step. Subsequently, in step 824, the UE 116 uses the particles to identify the best beam index i* for the wireless communication based on the codebook 814.

The angles of the particles can be initialized based on evenly distributed points on sphere such as using a Fibonacci grid, random sampling of points from space, and the like. the gain of the particles in the initial iteration is described in Equation (2).

$$g_t^{[m]} = z_t \cdot g_{i_0}(\theta_m, \varnothing_m)$$

$$R_t^{[m]} = R(\alpha_t + \widetilde{\alpha_t^{[m]}}, \beta_t + \widetilde{\beta_t^{[m]}}, \gamma_t + \widetilde{\gamma_t^{[m]}})$$

$$R_{t-1}^{[m]} = R(\alpha_{t-1} + \widetilde{\alpha_{t-1}^{[m]}}, \beta_{t-1} + \widetilde{\beta_{t-1}^{[m]}}, \gamma_{t-1} + \widetilde{\gamma_{t-1}^{[m]}})$$

Equation (2)

Here, $\widetilde{\alpha_t^{[m]}}$, $\widetilde{\beta_t^{[m]}}$, and $\widetilde{\gamma_t^{[m]}}$ is the perturbation in the particle m, which is generated according to the known sensor error statistics, $\sigma_\alpha$, $\sigma_\beta$, $\sigma_\gamma$. Once the particles are updated the beam that is used to perform the wireless communication can be selected based on the particles and the codebook 814.

In certain embodiments, the angles of the new particles are inserted based on evenly distributed points on the sphere, (such as obtained using Fibonacci grid, and/or random sampling of points from the space). The channel gain of the new particles can be decided based on the reference signal measurements, including but not limited to the most recent measurement.

In certain embodiments, to identify the best beam (step 824), the UE 116 identifies a mean direction based on the gains and angles of all the particles. The identified mean direction is then compared with the beam-decision regions of the beams. FIG. 8C illustrates the diagram 830 that includes a table 832 and a map 834. The map 834 depicts gains corresponding to eight different beams representing example beam decision regions for a codebook (such as the codebook 814). The table 832 identifies, by different colors (or shading) the different beams within the map 834. The numbers next to the table 832 identify the beam index of each color within the map 834. The eight beams are located over a different regions of the example map 834, where each of the regions represent a gain associated with one of the eight beams. For instance, the beam-decision region of a beam j is the angular region in which the gain of beam j is larger than any other beam in the codebook. If the mean direction found from the particles lies in the decision region of beam j, then beam j is declared as the best beam, i.e., i*=j, in step 824. That is, the UE 116 compares the identified mean direction to the different regions of a beam map. The UE 116 then identifies a region of the beam decision map that corresponds with the identified mean direction, where the identified region represents the gain of a beam that is selected for performing the wireless communication.

In certain embodiments, to identify the best beam (step 824), the UE 116 counts the number of particles in the decision region that corresponds to each of the beams (such as the illustrated in the beam decision regions of the map 834). The beam which has the highest number of particles in its decision region is declared as the best beam. For example, the UE 116 counts the particles within each of the eight different beam decision regions of the map 834 and identifies a particular region of the map 834 that corresponds to a particular beam includes the highest number of particles. The beam that corresponds to the region of the map 834 that includes the highest number of particles is selected for performing the wireless communication.

In certain embodiments, the UE 116 uses a wide beam codebook in steps 812 and 816 but identifies the beam for performing the wireless communication (step 824) from the narrow beam codebook. The UE 116 can use a particle filter (or Extended Kalman Filter, or Unscented Kalman Filter, and the like) to combine the reference signal measurements and the sensor measurements. Since there are usually fewer number of wide beams are required to cover the spherical region number of codewords in wide beam codebook are fewer than the number of codewords in narrow beam codebook. Therefore, when the channel state changes, (such as from line-of-sight (LOS) to non-line-of-sight (NLOS), and the AoA completely changes) it takes less time to see the whole sphere using reference signal measurements based on wide beam codebook, than what it would take based on narrow beam codebook. By using a wide beam codebook for measuring the reference signals but using the narrow beam codebook for identifying a beam provides a rapid estimate of the best narrow beam for performing the wireless communication.

For example, given the gains and angles of all the particles, a mean direction is first found, which can be considered an estimate of the AoA. This mean direction is then compared with the beam-decision regions (such as shown in FIG. 8C) of the beams in narrow beam codebook. The beam-decision region of a beam j in narrow beam codebook is the angular region on a unit sphere in which the gain of beam j is larger than any other beam in the narrow beam codebook. If the mean direction found from the particles lies in decision region of beam j, then beam j is declared as the best beam, i.e., i*=j.

For another example, the number of particles in the decision region (such as shown in FIG. 8C) of each beam in narrow beam codebook are counted. The beam which has the highest number of particles in its decision region is declared as the best beam.

In certain embodiments, the UE 116 determines the beam to measure adaptively instead of sequentially. For example, the beams are ordered based on the distance to the mean direction of particles or the concentration of particles. The UE 116 can then choose to measure the beam with highest likelihood of being the best beam or measure a few beams with the highest likelihoods. By measuring only a few beams can reduce the searching overhead, when there is a large codebook.

FIG. 8D illustrates the table 835 indicating how different states affect the particle filer according to embodiments of the present disclosure. The number of particles and the number of new particles of each time step can change based on the speed the UE is traveling and/or LOS/NLOS channel. The speed of the UE 116 can be detected from the motion sensor such as an accelerometer. The speed of the UE 116 can be detected through a global positioning receiver of the UE 116 that can receive signals from a global positioning system (GPS). The LOS/NLOS channel state can be detected from the channel impulse response estimation. The channel impulse response estimation can be from a wireless modem.

For example, in a LOS state, the UE 116 can use low values for the number of particles, M, and the number of new particles, N. Similarly, when the UE speed is considered slow (such as slower than 10 km/h), UE 116 can use low values for the number of particles, M, and the number of new particles N. Low values of M could be 800 and low values of N could be 100. It is noted that other numbers for M and N could be used. When the UE speed is considered medium (such as between 10 km/h and 30 km/h) UE 116 can use intermediate values for the number of particles, M, and the number of new particles N. Intermediate values of M could be 1,000 and intermediate values of N could be 150. It is noted that other numbers for M and N could be used.

For another example, in a NLOS state, the UE 116 can use high values for the number of particles, M, and the number of new particles N. Similarly, when the UE speed is considered high (such as above 30 km/h) UE 116 can use high values for the number of particles, M, and the number of new particles N. High values of M could be 1,200 and high values of N could be 200. It is noted that other numbers for M and N could be used.

For yet another example, when the channel state of the UE 116 is transitioning from LOS to NLOS or from NLOS to LOS, the UE 116 can increase the values of M and N for several iterations and then return to the previously determined number of particles, M, and the number of new particles N. For example, M could be set to 2,000 and N could be set to 400 for a number of time steps. The number of time steps could be set to 20 time steps. It is noted that other numbers for M and N and the number of time steps that M and N are increased could be used.

The state of the particle filter provides information that can help tune other UE-operations. As an example, the concentration of the particles can provide information about the channel state. In certain embodiments, the concentration of particles can be calculated using an angle spread measure. If the spread is low, i.e., more concentration, the channel state is likely to be LOS, whereas, if the spread is high, i.e., less concentration, the channel state is likely to be NLOS. The knowledge of channel state can in turn be used for other tasks such as selecting a codebook optimized for detected channel state. Similarly, a sudden change in the concentration of particles can imply a channel state change which can be used as a trigger for certain operations, e.g., in hierarchical beam search, such a trigger can be used to change from beam refinement to full beam search. Finally, the rate at which the weights of the particles change can suggest the rate of channel change and can be used to adjust the RF information rate, i.e., the number of RF measurements made per second.

FIG. 8E illustrates the method 840 for identifying a beam for wireless communication according to embodiments of the present disclosure. For example, in the method 840, the UE 116 uses the beam determined from the reference signal measurement information and uses the motion sensor information to rotate and overlap to determined beam's decision region to find the best beam.

Specifically, the UE determines which of the beam to measure (step 842), measures the reference signal measurement (step 846), and decides the intermediate best beam i (step 484). For example, the UE 116, in step 842, the UE 116 determines which beam to measure and then measures the determined beam. For example, the UE 116 can determine which beam to measure based in part on the codebook 844. The codebook 844 includes a set of codewords, where a codeword is a set of analog phase shift values, or a set of amplitude plus phase shift values, applied to the antenna elements, in order to form an analog beam. In step 846, the UE 116 measures the beam (using the RF transceiver 310 of FIG. 3) to determine a reference signal measurement from the measured beam. The UE 116 can use the codebook 844 when determine a reference signal measurement from the measured beam. In certain embodiments, the reference signal measurement is RSRP at time t, $z_t$. In other embodiments, the reference signal measurement is SINR, SNR, RSRQ, or the like. In step 848, the UE identifies an intermediate beam based on the reference signal measurement of step 846. For example, the intermediate beam can be based on the beam of multiple beams with the highest RSRP of the beams.

In step 850, the UE 116 obtains the motion information from the motion sensor (such as the motion sensor 365 of FIG. 3). In certain embodiments, the sensor is an IMU that detects motion as well as a direction and magnitude of the detected motion. The UE 116 can obtain motion sensor measurements at time t, $s_t$.

In step 852, the UE 116 then rotates the beam decision region of the intermediate best beam $\bar{i}^*$, based on the orientation change from the time the intermediate best beam $\bar{i}^*$ was measured to the current time. The UE 116 can use the codebook 844 when rotating the decision region of the intermediate best beam $\bar{i}^*$. The rotated decision region is then overlapped with the un-rotated decision region of the all the beams, and the beam with the highest overlap is identified as the beam for performing the wireless communication (step 854). The UE 116 can use the codebook 844 when identifying the beam for performing the wireless communication.

Although FIGS. 8A through 8E illustrate example methods and diagrams, various changes may be made to FIGS. 8A through 8E. For example, while the methods 810 and 840 are shown as a series of steps, various steps could overlap, occur in parallel, occur in a different order, or occur multiple times. In another example, steps may be omitted or replaced by other steps.

Figure 9A:
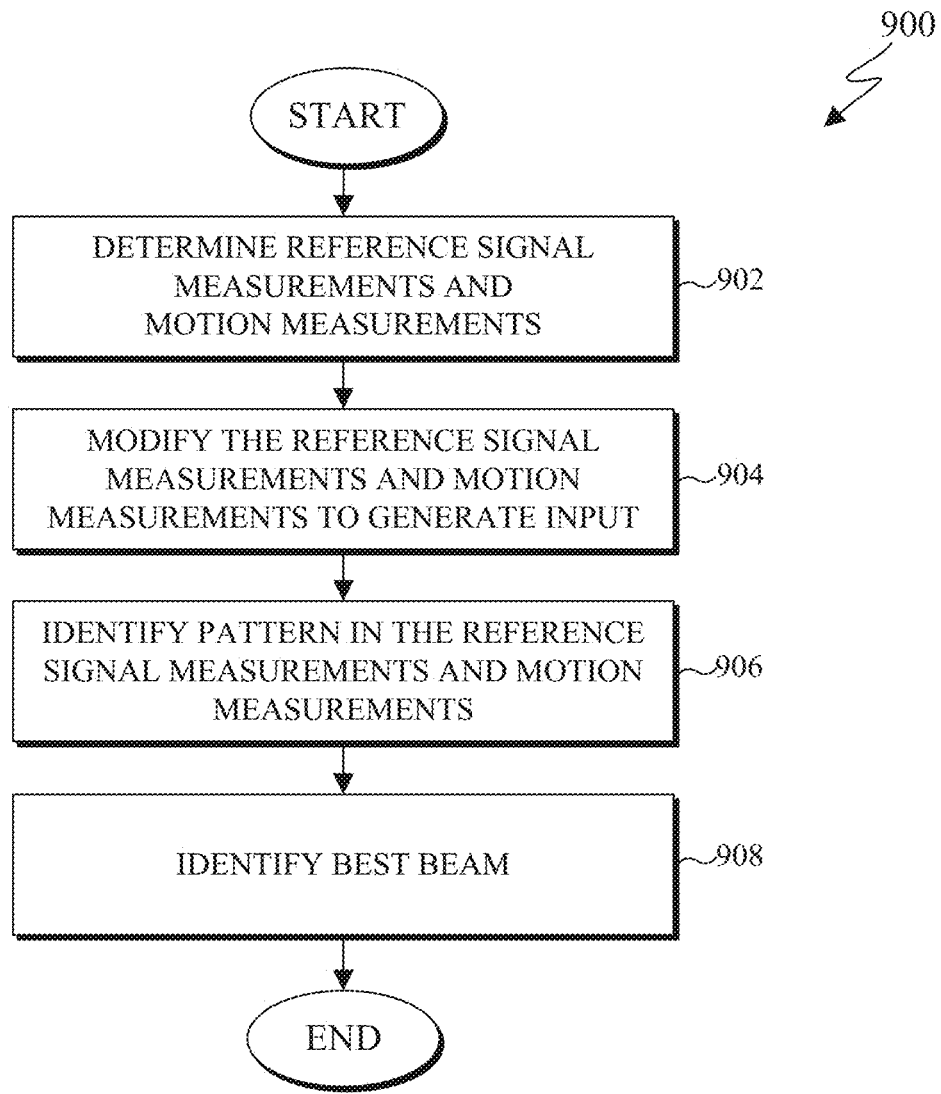
FIG. 9A illustrates an example method for identifying a beam to perform wireless communication according to embodiments of the present disclosure.
Figure 9B:
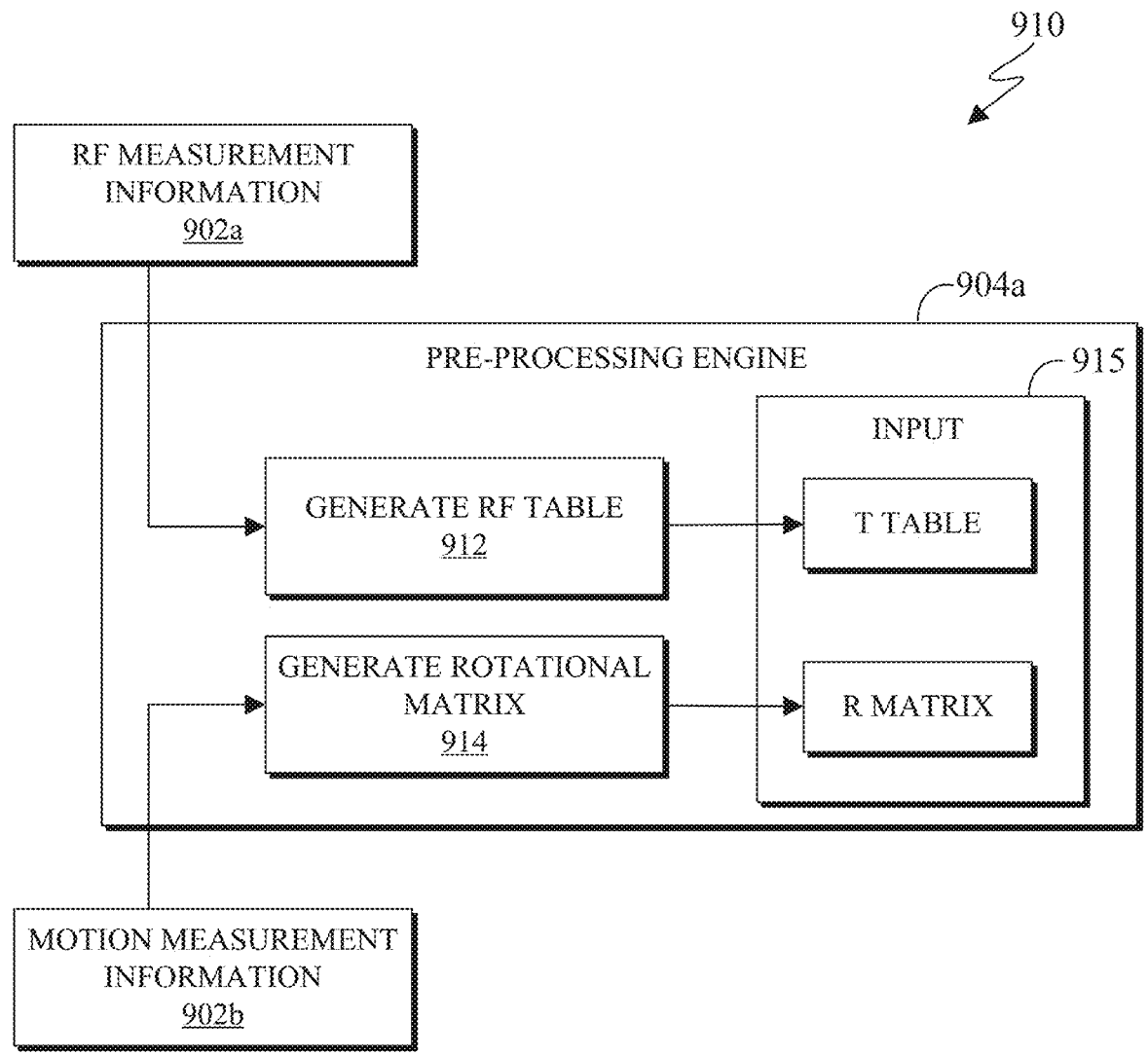
FIG. 9B illustrates an example process of modifying the reference signal and motion measurements to generate an input according to embodiments of the present disclosure.
Figure 9C:
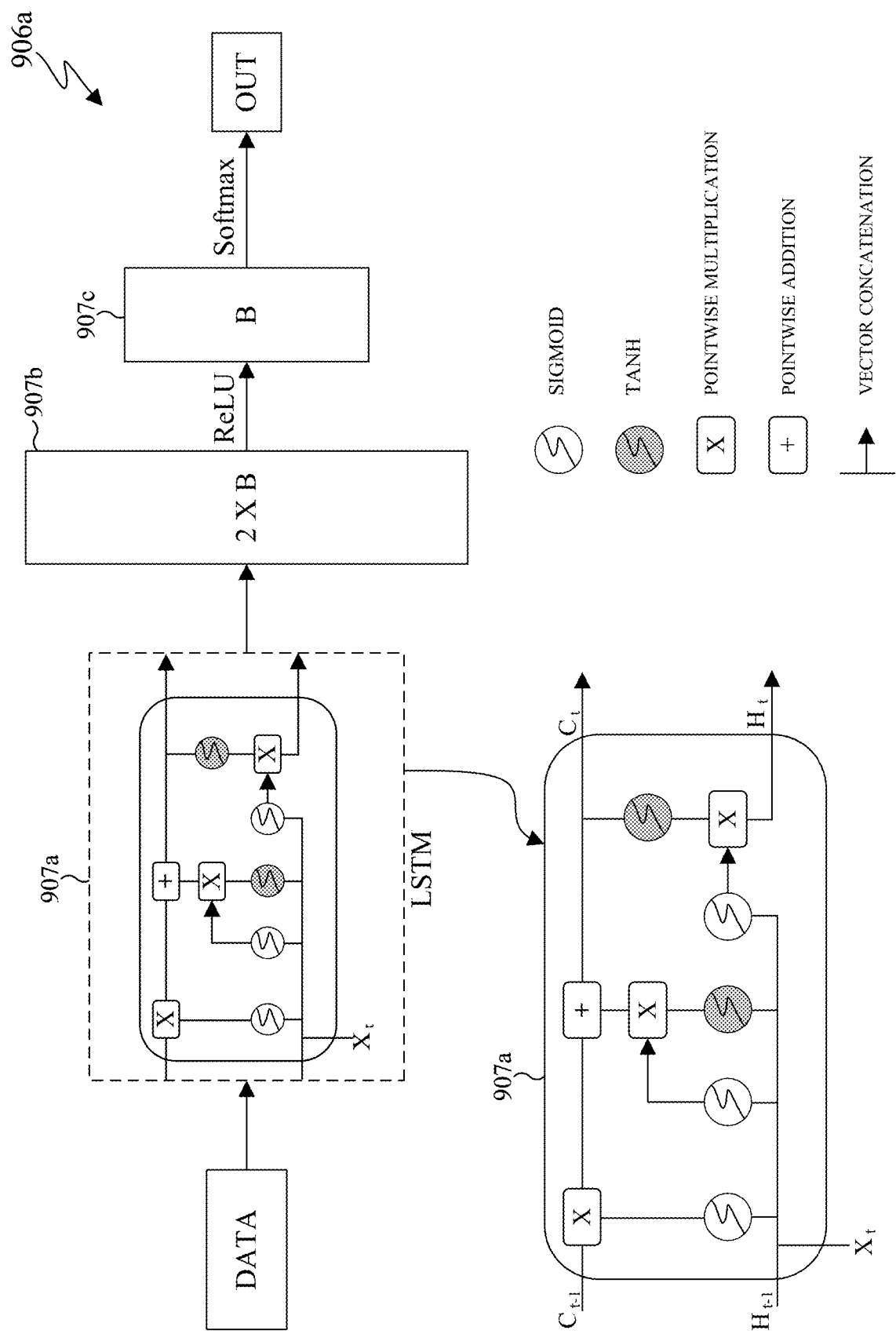
FIGS. 9C and 9D illustrate example diagrams for identifying a pattern in the reference signal and motion measurements according to embodiments of the present disclosure.
Figure 9D:
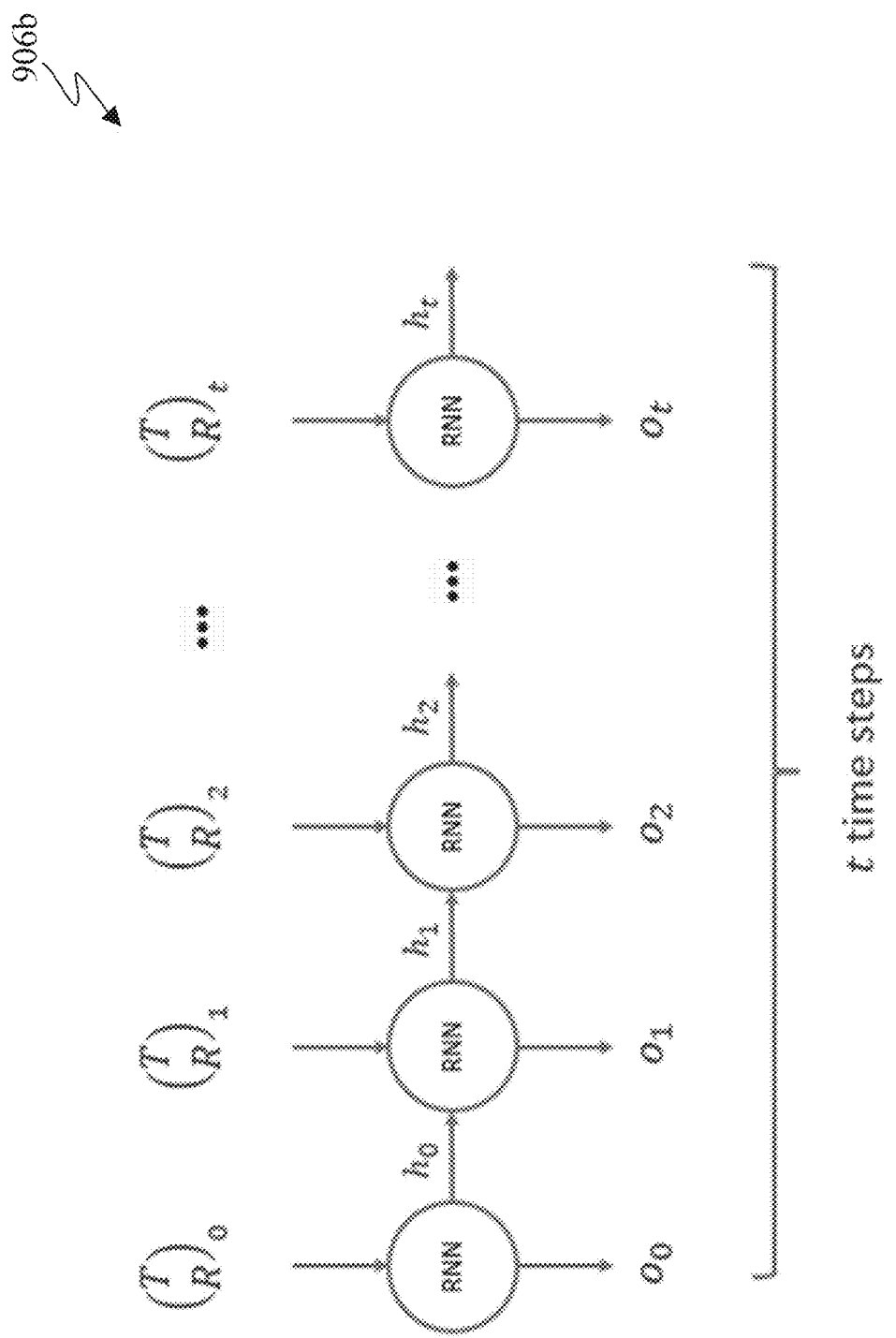
Figure 9E:
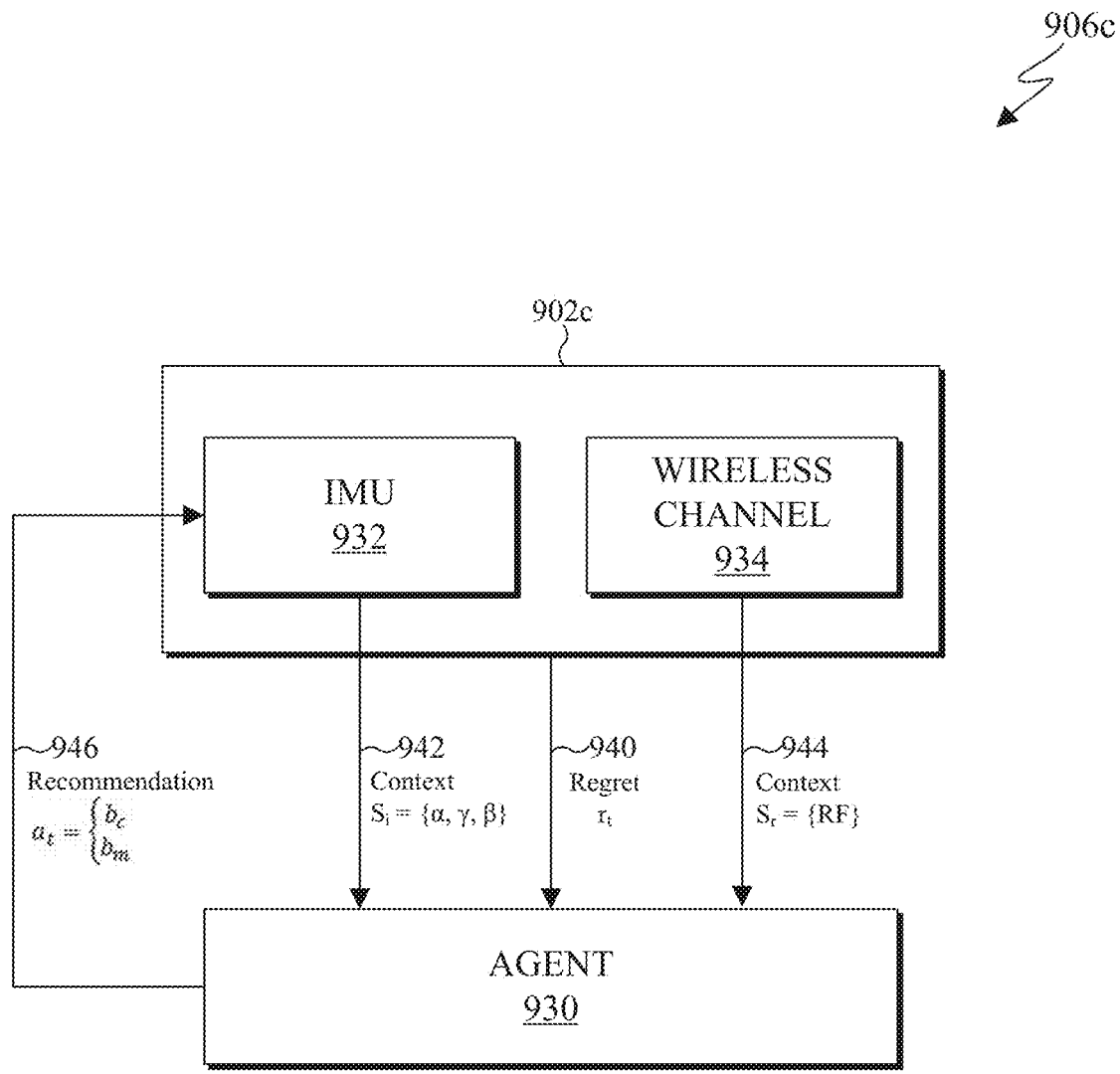
FIG. 9E illustrates a reward system to identify a beam for wireless communication according to embodiments of the present disclosure.

FIG. 9A illustrates an example method 900 for identifying a beam to perform wireless communication according to embodiments of the present disclosure. FIG. 9B illustrates an example process 910 of modifying the reference signal and motion measurements to generate an input according to embodiments of the present disclosure. FIGS. 9C and 9D illustrate example diagrams 906a and 906b, respectively, for identifying a pattern in the reference signal and motion measurements according to embodiments of the present disclosure. FIG. 9E illustrates a reward system 906c to identify a beam for wireless communication according to embodiments of the present disclosure. The steps of the method 900 can be performed by the any of the UEs 111-116 of FIG. 1 the UE 116 of FIG. 4, the electronic device 401 of FIG. 4. The embodiments of FIGS. 9A-9D are for illustration only and other embodiments can be used without departing from the scope of the present disclosure.

Embodiment of the present disclosure provide systems and methods for using a supervised learning approach for identifying a beam for wireless communication based on reference signal measurements or motion measurements. As discussed above, as the wireless channel is subject to change, due to changes in the orientation of the UE 116 or as the UE moves. As such, the beam for wireless communication is periodically updated. The method 900 of FIG. 9A can be used in addition to the method 810 of FIG. 8B.

As shown in in FIG. 9A, the method 900 in step 902, determines both a reference signal measurement and motion measurements of the UE 116. For example, the UE 116 measures a beam (using the RF transceiver 310 of FIG. 3) to determine a reference signal measurement from the measured beam. The UE 116 can use the codebook 814 when determine a reference signal measurement from the measured beam. In certain embodiments, the reference signal measurement is RSRP. In other embodiments, the reference signal measurement is SINR, SNR, RSRQ, or the like. Similarly, the UE 116 obtains motion sensor measurements from a sensor such as the sensor 365 of FIG. 3. In certain embodiments, the sensor is an IMU that detects motion, and orientation of the UE 116. For example, the movement information, that is obtained by the motion sensor, can identify the direction and magnitude of the detected motion. The UE 116 can obtain movement measurements.

In step 904, the UE 116 modifies the reference signal measurement and the motion measurements. In certain embodiments, the UE 116 uses a pre-processing engine, such as the pre-processing engine 904a of FIG. 9B to modify the reference signal measurement and the motion measurements. Modifying reference signal measurement and the motion measurements pre-processes the data to prepare and transform the data into a format that is subsequently used in step 906.

In step 906, the UE 116 identifies patterns in the reference signal measurement and the motion measurements. The UE 116 can stream the processed data from step 904 and detect an underlining pattern in the data to accurately identify the best beam index to use for wireless communication (step 908). In certain embodiments, the UE 116 uses a neural network, such as illustrated in FIGS. 9C and 9D for detecting patterns in the data in order to identify a beam for wireless communication (step 908).

The training data for supervised learning can be obtained from synthetic/simulation data. The training data can be obtained for different UE condition, channel conditions and UE measurement behavior, such as different moving speeds (5 km/h, 20 km/h or 60 km/h), different UE orientation or change of UE orientation, different sensor error characteristics, RF measurement pattern over time (including periodic measurement with various intervals, or intermittent measurement), and number of total UE beams. The identified beam for communication can be compared to the identified beam based on the reference signal measurements for determining the accuracy of the identified patter. For example, the UE 116 can generate and maintain a reference signal measurement table to store the measurement results for the beams. The table size can be equal to the number of total UE beams. The table can be updated after every measurement for the beam.

The process 910 of FIG. 9B describes how the UE 116 modifies the reference signal measurement and the motion measurements as discussed in step 904 of FIG. 9A in order to generate an input 915 to the neural network. In particular, a pre-processing engine 904a receives the reference signal measurements 902a and the motion measurement information 902b. The pre-processing engine 904a then modifies the input information (902a and 902b) such that a neural network can identify patterns within the information. The reference signal measurements 902a and the motion measurement information 902b could be from the step 902 of FIG. 9A. The pre-processing engine 904a can be an application such as one of the applications 362 of FIG. 3.

To generate RF table 912, the pre-processing engine 904a generates a table (referred to as T table) based on the received reference signal measurement information 902a. To generate the rotational matrix 914, the pre-processing engine 904a generates a matrix (referred to as R matrix) based on the received motion measurement information 902b. For example, at time step t, the reference signal measurement value $P_t$ of beam index $i \in [0, B-1]$ is updated and the motion measurement information $I_t = (\alpha, \beta, \gamma)$ is measured.

To generate the RF table 912, the pre-processing engine 904a coverts $P_t$ (which is the reference signal measurement information 902a) to $T_t$, which is a one-dimensional (1D) vector where the value at the index i is set to $P_t$ and other values at other indices are set to 0. Equation (3) is an example table where index i=1 and number of beams B=5. Equation (3) is $$T_t = \begin{bmatrix} 0 \\ P_t \\ 0 \\ 0 \\ 0 \end{bmatrix} \qquad \text{Equation (3)}$$

Here, one reference signal measurement is obtained at a given time t. If reference signal measurements of more than one beam are obtained at a given time t, then $T_t$ contains the reference signal measurement values at indices corresponding to the beams used for measurement To generate the rotational matrix 914, the pre-processing engine 904a generates a three-by-three matrix, R, based on $I_t$ (which is the motion measurement information 902b). The matrix R is function of the orientation $(\alpha, \beta, \gamma)$ as obtained from the motion sensor. Equation (4) describes how to generate the R matrix. The R matrix can be flattened to become a 1D vector input with a size of nine.

$$R(\alpha, \beta, \gamma) = R_z(\alpha) \times R_y(\beta) \times R_x(\gamma) \qquad \text{Equation (4)}$$

Where:

$$R_x(\gamma) = \begin{bmatrix} 1 & 0 & 0 \\ 0 & \cos(\alpha) & -\sin(\alpha) \\ 0 & \sin(\alpha) & \cos(\alpha) \end{bmatrix}$$

$$R_y(\beta) = \begin{bmatrix} \cos(\alpha) & 0 & \sin(\alpha) \\ 0 & 1 & 0 \\ -\sin(\alpha) & 0 & \cos(\alpha) \end{bmatrix}$$

$$R_z(\alpha) = \begin{bmatrix} \cos(\alpha) & -\sin(\alpha) & 0 \\ \sin(\alpha) & \cos(a) & 0 \\ 0 & 0 & 1 \end{bmatrix}$$

The pre-processing engine 904a then generates the input 915 by combine the T table and the R matrix to become a 1D vector input $x_t$ with a size of B+9. The input 915 can be the provide to the neural network to identify a pattern from the reference signal measurements and the motion measurements (as discussed in step 906 of FIG. 9A).

That is, the pre-processing engine 904a converts the reference signal measurements into a tabular form that includes both index information of the beams and the reference signal measurements. The pre-processing engine 904a also transforms the motion measurements to a rotational matrix that describes the orientation of the UE 116. In certain embodiments, the pre-processing engine 904a can also generate metadata that indicates the temperature of the UE, the power consumption of the UE, and the geolocation of the UE. In certain embodiments. the metadata can be combined with the reference signal measurements and the motion measurements.

FIGS. 9C and 9D illustrate the diagrams 906a and 906b for identifying a pattern in the reference signal and motion measurements based on the step 906 of FIG. 9A. A Recurrent Neural Network (RNN) is shown in the diagram 906a. An RNN is a type of Artificial Neural Network (ANN) that handle time sequence data. The RNN can be implemented long-short-term memory (LSTM) 907a. Along with the LSTM 907a, a couple of fully connected (FC) layers (907b and 907c) are included in the RNN. These layers (907b and 907c) that are in charge of recognizing non-linear pattern from the feature vector extracted from the LSTM 907a to produce the beam index information. The first FC layer 907b includes of 2×B neurons where B is the number of beams. It is followed by a ReLU activation function. The second FC layer 907c includes B neurons followed by a Softmax activation function to produce the probability of the beam indices.

The purpose of using the LSTM 907a is to learn the temporal relation between each data frame in the time series. The LSTM 907a can identify a pattern in the temporal domain. The LSTM 907a is designed to avoid the long-term dependency problem. For example, the LSTM 907a includes of its cell state, activation function (sigmoid and tanh) and various logical gates (pointwise addition and multiplication). The cell state act as a transport highway that transfers relative information all the way down the sequence chain. The cell state can be thought of as the memory of the network. It can carry relevant information throughout the processing of the sequence. So even information from the earlier time steps can make its way to later time steps, reducing the effects of short-term memory loss. As the cell state goes on its journey, information is added or removed to the cell state via the network gates. The gates are basically tiny neural networks that decide which information is allowed on the cell state. The gates can learn what information is relevant to keep or forget during the training.

The diagram 906a in FIG. 9C describes the overall process for identifying patterns. For example, at time step t the preprocessed input $x_t$ (input 915) is provided to the LSTM 907a. The LSTM 907a uses the encoded vector and the hidden state $h_{t-1}$ produced from the previous time step (it is blank if t=0) to derive the best beam index $o_t$ as well as the hidden state $h_t$ at time t, as illustrated in the diagram 906b of FIG. 9D. The hidden state h is a feature vector that encapsulate the memory of the ANN. That is, each hidden state $h_t$ of as illustrated in the diagram 906b is maintained in the RNN at subsequent time steps. This enables underlying patterns to be learned in order to generate a prediction for identifying a beam for wireless communication.

The reward system 906c, of FIG. 9E, is generally used to identify a beam for wireless communication. In particular, the reward system 906c includes a reinforcement learning (RL) process has the incentive to approach the problem in a different learning paradigm instead of Supervised Learning as described above. For example, the reward system 906c can be used in the step 906 of FIG. 9A.

As illustrated in FIG. 9E, the reward system 906c includes sensors 902c. One of the sensors 902c include an IMU 932. The IMU 932 provides an orientation measurement $\{\alpha, \gamma, \beta\}$ such as context 942. For example, the context 942 can be the motion information that was obtained in step 902 of FIG. 9A. Another one of the sensors 902c, is a wireless channel 934. The wireless channel 934 provide beam measurements (reference signal measurements), such as context 944. The agent 930 provides recommendations 946 which select beams to measure $b_m$ and select beams for actual communication $b_c$. regret $r_t$ 940 is the reward/regret function that is collected after using the beam $b_c$ for communication.

Techniques such as Thompson Sampling or Policy Gradient can be used to train and make the decisions on the go (online learning) in order to adapt to the specific situation and environment. Using the RL approach, a reward function that rewards or punishes the agent 930 based on the decisions of the agent 930 decision can be used to maximize the cumulative (or average) reference signal measurement value. The regret function 940 rewards or punishes the agent 930 based on its selections. An example regret function 940 which is described in Equation (5), below.

$$R = 20 \times (\log_{10} y - \log_{10} p) \qquad \text{Equation (5)}$$

Here, y is the reference signal measurement of the best beam in linear scale at time step t and p is the reference signal measurement of the beam that is used for communication in linear scale at time step t. Then the regret R is the regret function 940 that rewards or punishes the agent 930 based on its selections.

Another example of the regret function 940 is described in Equation (6) below. Equation (6) is based on calculating the difference in dB power of communication beams c between two consecutive time steps. Equation (6), as described below, indicates that if the best beam cannot be picked the next appropriate beam might be used.

$$R = 20 \times (\log_{10} c_t - \log_{10} c_{t-1}) \qquad \text{Equation (6)}$$

In certain embodiments, reward system 906c can used to make beam adjustment decisions based on the reference signal measurements (from the wireless channel 934), the motion measurements (from the IMU 932) and one or more other criteria such as power consumption, temperature, avoiding frequent beam changes, and maintaining a certain signal quality (a reference signal measurement that is above a threshold). For example, rather than focusing on obtaining the best beam, the reward system 906c can be designed to avoid frequent beam change (which can help save power). As such, the reward system 906c can be designed to be an increasing function of the duration that a selected beam can maintain a certain signal quality (such as a reference signal measurement that is above a threshold).

In certain embodiments, the UE 116 can include a scheduling unit to measure beams systematically based on a round robin in order to account for prior beam management solutions. For example, after initially using a round robin approach, the UE 116 can determine whether the reference signal measurement is improved. When the reference signal measurement is improved the scheduling unit will restart at index $i = i_c - 1$, where $i_c$ is the beam index that was selected for the previous wireless communication. When the reference signal measurement is not improved, the scheduling unit will continue to measure the next beam in the round.

Although FIGS. 9A through 9E illustrate example methods and diagrams, various changes may be made to FIGS. 9A through 8E. For example, while the method 900 is shown as a series of steps, various steps could overlap, occur in parallel, occur in a different order, or occur multiple times. In another example, steps may be omitted or replaced by other steps.

Figure 10:
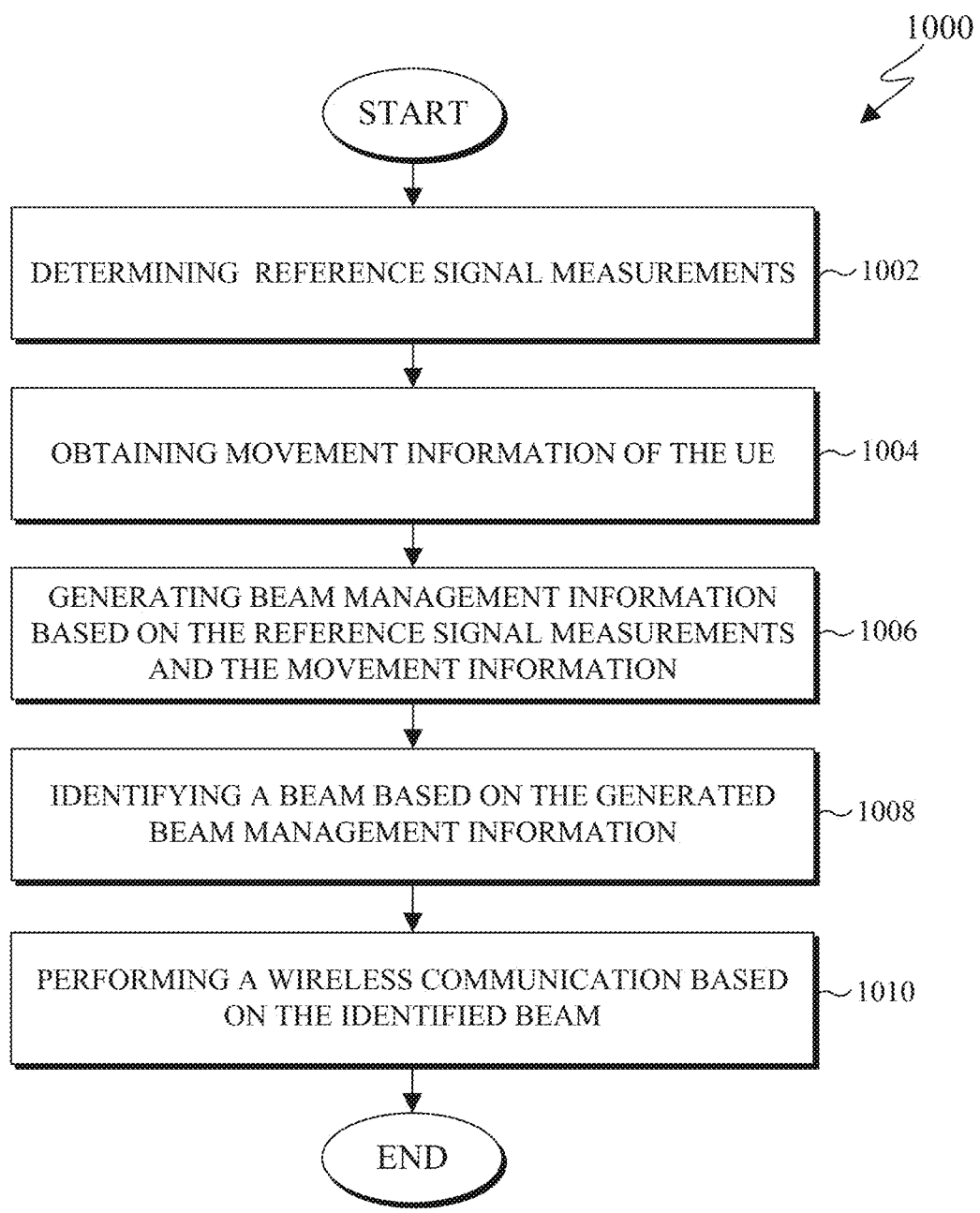
FIG. 10 illustrates a method for beam management by a UE in a wireless communication system according to embodiments of the present disclosure.

FIG. 10 illustrates a method 1000 for beam management by a UE in a wireless communication system according to embodiments of the present disclosure. The method 1000 can be performed by any of the UEs of FIG. 1 and include internal components similar to the UE 116 of FIG. 3 and the electronic device 401 of FIG. 4. For ease of explanation, method 1000 is performed by a processor, such as the processor 340 of the UE 116.

In step 1002, the processor 340 determines reference signal measurements from signals. The signals can be received from a base station. For example, the UE 116 can receive signals that are transmitted from one or more base stations. The UE 116 then determines a reference signal measurements, such as power from the received signals.

In step 1004, the processor 340 obtains movement information of the UE 116. For example, a motion sensor, (such as the sensor 365 of FIG. 3) can detect motion of the UE 116. In certain embodiments, the motion sensor is an IMU, such as an accelerometer, gyroscope, and the like, which can detect and measure motion movement of the UE 116.

In step 1006, the processor 340 generates beam management information. The beam management information is based on one or more of the reference signal measurements of step 1002 and the movement information of step 1004. In certain embodiments, the processor 340 identifies one or more parameters associated with the one or more of the reference signal measurements and the movement information. Based on the one or more parameters, the processor 340 determines whether to use one or more of the reference signal measurements or combine the one or more of the reference signal measurements with the movement information to generate the beam management information.

In certain embodiments, the processor 340 compares a rotational speed of the UE 116, based on the motion sensor information to a threshold, when determining whether to use the one or more of the reference signal measurements or combine the one or more of the reference signal measurements with the movement information to generate the beam management information. For example, when the rotational speed of the UE is above the threshold, the processor 340 determines to combine the one or more of the reference signal measurements with the movement information to generate the beam management information. Alternatively, when the rotational speed of the UE is below the threshold, the processor 340 determines to use the one or more of the reference signal measurements to generate the beam management information.

In certain embodiments, the processor 340 compares an error level associated with the movement of the motion sensor to a threshold, when determining whether to use the one or more of the reference signal measurements or combine the one or more of the reference signal measurements with the movement information to generate the beam management information. For example, when the error level of the motion sensor is below the threshold, the processor 340 determines to combine the one or more of the reference signal measurements with the movement information to generate the beam management information. Alternatively, when the error level of the motion sensor is above the threshold, the processor 340 determines to use the one or more of the reference signal measurements to generate the beam management information.

In certain embodiments, the processor 340 compares an error level associated with the reference signal measurement to a threshold, when determining whether to use the one or more of the reference signal measurements or combine the one or more of the reference signal measurements with the movement information to generate the beam management information. For example, when the error level of the reference signal measurement is below the threshold, the processor 340 determines to combine the one or more of the reference signal measurements with the movement information to generate the beam management information. Alternatively, when the error level of the reference signal measurement is above the threshold, the processor 340 determines to use the one or more of the reference signal measurements to generate the beam management information.

In certain embodiments, the processor 340 compares an update rate of the reference signal measurements to an update rate of the movement measurements, when determining whether to use the one or more of the reference signal measurements or combine the one or more of the reference signal measurements with the movement information to generate the beam management information. For example, when the update rate of the reference signal measurements is less than the update rate of the movement information, the processor 340 determines to combine the one or more of the reference signal measurements with the movement information to generate the beam management information. Alternatively, when the update rate of the reference signal measurements is greater than the update rate of the movement information, the processor 340 determines to use the one or more of the reference signal measurements to generate the beam management information.

After determining to generate the beam management information based on the reference signal measurements (not the combination of the or more of the reference signal measurements with the movement information), the processor 340 generates the beam management information, based on RSRP, SINR, SNR, RSRQ, and the like.

After determining to generate the beam management information based on the combination of the or more of the reference signal measurements with the movement information, the processor 340 can use various types of filters to perform the combination. For example, a particle filter is an example filter that can be used to combine the one or more of the reference signal measurements with the movement information to generate the beam management information. For instance, the processor 340 identifies a plurality of particles associated with the particle filter. The particles can be based on an angle of arrival and a gain. The processor 340 then updates the plurality of particles based on the reference signal measurements and the movement information. After updating the plurality of particles, the processor 340 identifies one or more new particles that are to be included in the particle filter. The updated particle filter is the generated beam management information. It is noted that the generated beam management information is continually updating at predefined intervals.

In step 1008, the processor 340 identifies a beam based on the beam management information. When the beam management information is based on the reference signal measurements (not the combination of the or more of the reference signal measurements with the movement information), the processor 340 identifies a beam based on the RSRP, SINR, SNR, RSRQ, and the like. When the beam management information is based on the combination of the or more of the reference signal measurements with the movement information, the processor 340 identifies a beam based on the updated particle filter. For example, the processor 340 can identify the beam based on the one or more new particles that are included in the particle filter.

In certain embodiments, to identify the beam, when the beam management information is based on the combination of the or more of the reference signal measurements with the movement information, the processor 340 identifies a mean direction of the plurality of particles. The processor 340 then compares the identified mean direction to regions of a beam map, such as the beam map 824 of FIG. 8C. The regions of the beam map represent gains of different beams. The processor 340 can identify a region of the beam map that corresponds with the identified mean direction. The identified region corresponds to a particular beam.

In other embodiments, the processor 340 identifies a first beam of the one or more beams, where the first beam corresponds to a region of the particle filter that includes a number of particles that is more than any other portion of the particle filter.

After identifying a beam, the processor 340 in step 1010 performs wireless communication based on the identified beam. In certain embodiments, when the beam management information is based on the reference signal measurements, the processor 340 identifies a beam based on the RSRP, SINR, SNR, RSRQ, and the like to perform the wireless communication. In other embodiments, when the beam management information is based on the combination of the or more of the reference signal measurements with the movement information, the processor 340 identifies the beam for the wireless communication based on the particle filter. For example, the processor 340 can identify the beam that is to be used for wireless communication based on the beam decision map. For another example, the processor 340 can identify the beam that is to be used for wireless communication based on the concentration of particles that correspond to a region of the particle map associated with the identified beam.

Although FIG. 10 illustrates example methods and diagrams, various changes may be made to FIG. 10. For example, while shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) for beam management in a wireless communication system, the UE comprising:
    a transceiver configured to receive signals from one or more base stations;
    a motion sensor configured to generate motion information; and
    a processor operably connected to the transceiver and the motion sensor, the processor configured to:
        determine reference signal measurements from the signals,
        obtain the motion information of the UE,
        generate beam management information for the beam management using a particle filter to combine the reference signal measurements and the motion information based on a comparison of the motion information to a threshold,
        identify a beam based on the generated beam management information, and
        perform wireless communication based on the identified beam.

2. The UE of claim 1, wherein the processor is further configured to:
    identify a plurality of particles associated with the particle filter, based on an angle of arrival and a channel gain,
    update the plurality of particles based on the reference signal measurements and the motion information,
    identify one or more new particles to be included in the particle filter, and
    identify the beam based on the plurality of particles and the one or more new particles for the wireless communication.

3. The UE of claim 2, wherein to identify the beam further the processor is configured to:
    identify a mean direction of the plurality of particles and the one or more new particles;
    compare the identified mean direction to regions of a beam decision map, wherein each of the regions represent a gain associated with one of multiple beams;
    identify a region of the beam decision map that corresponds with the identified mean direction, wherein the identified region represents gain of a first beam of the multiple beams; and
    identify the first beam as the beam for performing the wireless communication.

4. The UE of claim 2, wherein the processor is further configured to:
    identify a first beam from one or more beams, wherein the first beam corresponds to a region of the particle filter that includes a number of particles more than any other of the one or more beams; and
    identify the first beam as the beam for performing the wireless communication.

5. The UE of claim 1, wherein the processor is further configured to:
- identify one or more parameters associated with at least one of the reference signal measurements and the motion information;
- determine whether to combine the reference signal measurements and the motion information to generate the beam management information based on the one or more parameters; and
- identify the beam based on the reference signal measurements, in response to a determination not to combine the reference signal measurements and the motion information based on the one or more parameters.

6. The UE of claim 5, wherein to identify the one or more parameters, the processor is configured to perform at least one of:
- compare a rotational speed of the UE based on the motion information to a first threshold;
- compare an error level associated with the motion information based on the motion sensor to a second threshold;
- compare error level associated with the reference signal measurements to a third threshold; and
- compare an update rate of the reference signal measurements to an update rate of the motion information.

7. The UE of claim 6, wherein:
- when the rotational speed of the UE is above the first threshold, the processor is configured to combine the reference signal measurements and the motion information;
- when the rotational speed of the UE is below the first threshold, the processor is configured to not combine the reference signal measurements and the motion information;
- when the error level associated with the motion information is below the second threshold, the processor is configured to combine the reference signal measurements and the motion information;
- when the error level associated with the motion information is above the second threshold, the processor is configured to not combine the reference signal measurements and the motion information;
- when the error level associated with the reference signal measurements is below the second threshold, the processor is configured to combine the reference signal measurements and the motion information;
- when the error level associated with the reference signal measurements is above the second threshold, the processor is configured to not combine the reference signal measurements and the motion information;
- when the update rate of the reference signal measurements is less than the update rate of the motion information, the processor is configured to combine the reference signal measurements and the motion information; and
- when the update rate of the reference signal measurements is greater than the update rate of the motion information, the processor is configured to not combine the reference signal measurements and the motion information.

8. The UE of claim 1, wherein the processor is configured to:
- modify a format of the reference signal measurements and the motion information into a vector;
- identify, using a neural network, a pattern from the reference signal measurements and the motion information; and
- identify the beam for the wireless communication based on the pattern.

9. The UE of claim 8, wherein:
to modify the reference signal measurements and the motion information into the vector the processor is configured to:
- convert the reference signal measurements into a one dimensional vector,
- transform the motion information into rotational matrix, and
- generate the vector corresponding to one time step, wherein the vector is based on a combination of the one dimensional vector and the rotational matrix; and to identify the pattern the processor is configured to:
- identify, using a long short-term memory (LSTM), a first beam based on the vector, the vector corresponds to a first time step,
- perform the wireless communication, at the first time step, based on the first beam,
- generate a second vector corresponding to a subsequent time step,
- identifying, using the LSTM, a second beam based on the second vector and the first beam, and
- perform the wireless communication, at the subsequent time step, based on the first beam.

10. The UE of claim 8, wherein the processor is configured to:
- generate feedback for a beam adjustment decision based on criteria, wherein the criteria includes at least one of a communication quality, power consumption, temperature, avoiding frequent beam changes, and maintaining certain signal quality, wherein the feedback provides a reward or a punishment to the neural network based on whether the identified beam satisfies the criteria;
- rate one or more beams to be measured for a subsequent time step base on the feedback from a previous time step; and
- recommend, at the subsequent time step, the one or more beams for measurement based on the rating.

11. A method for beam management by a user equipment (UE) in a wireless communication system, the method comprising:
- determining reference signal measurements from signals received from one or more base stations;
- obtaining, from a motion sensor, motion information of the UE;
- generating beam management information for the beam management using a particle filter to combine the reference signal measurements and the motion information based on a comparison of the motion information to a threshold;
- identifying a beam based on the generated beam management information; and
- performing wireless communication based on the identified beam.

12. The method of claim 11, further comprising:
- identifying a plurality of particles associated with the particle filter, based on an angle of arrival and a channel gain,
- updating the plurality of particles based on the reference signal measurements and the motion information,
- identifying one or more new particles to be included in the particle filter, and identifying the beam based on the plurality of particles and the one or more new particles for the wireless communication.

13. The method of claim 12, wherein identifying the beam further comprises:
    identifying a mean direction of the plurality of particles and the one or more new particles;
    comparing the identified mean direction to regions of a beam decision map, wherein each of the regions represent a gain associated with one of multiple beams;
    identifying a region of the beam decision map that corresponds with the identified mean direction, wherein the identified region represents gain of a first beam of the multiple beams; and
    identifying the first beam as the beam for performing the wireless communication.

14. The method of claim 12, further comprising:
    identifying a first beam from one or more beams, wherein the first beam corresponds to a region of the particle filter that includes a number of particles more than any other of the one or more beams; and
    identifying the first beam as the beam for performing the wireless communication.

15. The method of claim 11, further comprising:
    identifying one or more parameters associated with at least one of the reference signal measurements and the motion information;
    determining whether to combine the reference signal measurements and the motion information to generate the beam management information based on the one or more parameters; and
    in response to a determination not to combine the reference signal measurements and the motion information based on the one or more parameters, identifying the beam based on the reference signal measurements.

16. The method of claim 15, wherein identifying the one or more parameters comprises at least one of:
    comparing a rotational speed of the UE based on the motion information to a first threshold;
    comparing an error level associated with the motion information based on the motion sensor to a second threshold;
    comparing error level associated with the reference signal measurements to a third threshold; and
    comparing an update rate of the reference signal measurements to an update rate of the motion information.

17. The method of claim 16, wherein:
    when the rotational speed of the UE is above the first threshold, determining to combine the reference signal measurements and the motion information;
    when the rotational speed of the UE is below the first threshold, determining to not combine the reference signal measurements and the motion information;
    when the error level associated with the motion information is below the second threshold, determining to combine the reference signal measurements and the motion information;
    when the error level associated with the motion information is above the second threshold, determining to not combine the reference signal measurements and the motion information;
    when the error level associated with the reference signal measurements is below the second threshold, determining to combine the reference signal measurements and the motion information;
    when the error level associated with the reference signal measurements is above the second threshold, determining to not combine the reference signal measurements and the motion information;
    when the update rate of the reference signal measurements is less than the update rate of the motion information, determining to combine the reference signal measurements and the motion information; and
    when the update rate of the reference signal measurements is greater than the update rate of the motion information, determining to not combine the reference signal measurements and the motion information.

18. The method of claim 11, further comprising:
    modifying a format of the reference signal measurements and the motion information into a vector;
    identifying, using a neural network, a pattern from the reference signal measurements and the motion information; and
    identifying the beam for the wireless communication based on the pattern.

19. The method of claim 18, wherein:
    modifying the reference signal measurements and the motion information into the vector comprises:
        converting the reference signal measurements into a one dimensional vector,
        transforming the motion information into rotational matrix, and
        generating the vector corresponding to one time step, wherein the vector is based on a combination of the one dimensional vector and the rotational matrix; and
    identifying the pattern comprises:
        identifying, using a long short-term memory (LSTM), a first beam based on the vector, the vector corresponds to a first time step,
        performing the wireless communication, at the first time step, based on the first beam,
        generating a second vector corresponding to a subsequent time step,
        identifying, using the LSTM, a second beam based on the second vector and the first beam, and
        performing the wireless communication, at the subsequent time step, based on the first beam.

20. The method of claim 18, further comprising:
    generating feedback for a beam adjustment decision based on criteria, wherein the criteria includes at least one of a communication quality, power consumption, temperature, avoiding frequent beam changes, and maintaining certain signal quality, wherein the feedback provides a reward or a punishment to the neural network based on whether the identified beam satisfies the criteria;
    rating one or more beams to be measured for a subsequent time step base on the feedback from a previous time step; and
    recommending, at the subsequent time step, the one or more beams for measurement based on the rating.

* * * * *